(12) United States Patent
Watanabe et al.

(10) Patent No.: US 8,259,810 B2
(45) Date of Patent: Sep. 4, 2012

(54) MPEG DECODER AND MPEG ENCODER

(75) Inventors: Yasuhiro Watanabe, Kawasaki (JP);
Hidetoshi Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1242 days.

(21) Appl. No.: 11/898,061

(22) Filed: Sep. 7, 2007

(65) Prior Publication Data

US 2008/0063082 A1    Mar. 13, 2008

(30) Foreign Application Priority Data

Sep. 7, 2006   (JP) ................................. 2006-242323

(51) Int. Cl.
*H04N 7/12* (2006.01)
(52) U.S. Cl. .............................. 375/240.23; 375/240.25
(58) Field of Classification Search ............. 375/240.23
See application file for complete search history.

(56) References Cited

U.S. PATENT DOCUMENTS

| 6,687,298 | B1 * | 2/2004 | Ikekawa | 375/240.15 |
| 6,717,989 | B1 * | 4/2004 | Simsic et al. | 375/240.26 |
| 2004/0076236 | A1 * | 4/2004 | Duruoz et al. | 375/240.25 |
| 2005/0147174 | A1 * | 7/2005 | Iwata | 375/240.23 |
| 2009/0051808 | A1 * | 2/2009 | Sumioka et al. | 348/420.1 |

FOREIGN PATENT DOCUMENTS

| JP | 10-56641 | 2/1998 |
| JP | 11-187393 | 7/1999 |
| JP | 2003-32679 | 1/2003 |

OTHER PUBLICATIONS

Chiang et al., "A Reduced Memory MPEG Video Decoder", 2004, pp. 31-35.*

* cited by examiner

*Primary Examiner* — Matthew Smithers
(74) *Attorney, Agent, or Firm* — Staas & Halsey LLP

(57) ABSTRACT

A moving picture decoding apparatus includes one or more variable-length decoding units, a data buffer configured to store data output from the one or more variable-length decoding units, and a plurality of image decoding units configured to read the data from the data buffer and to perform image decoding the data.

20 Claims, 26 Drawing Sheets

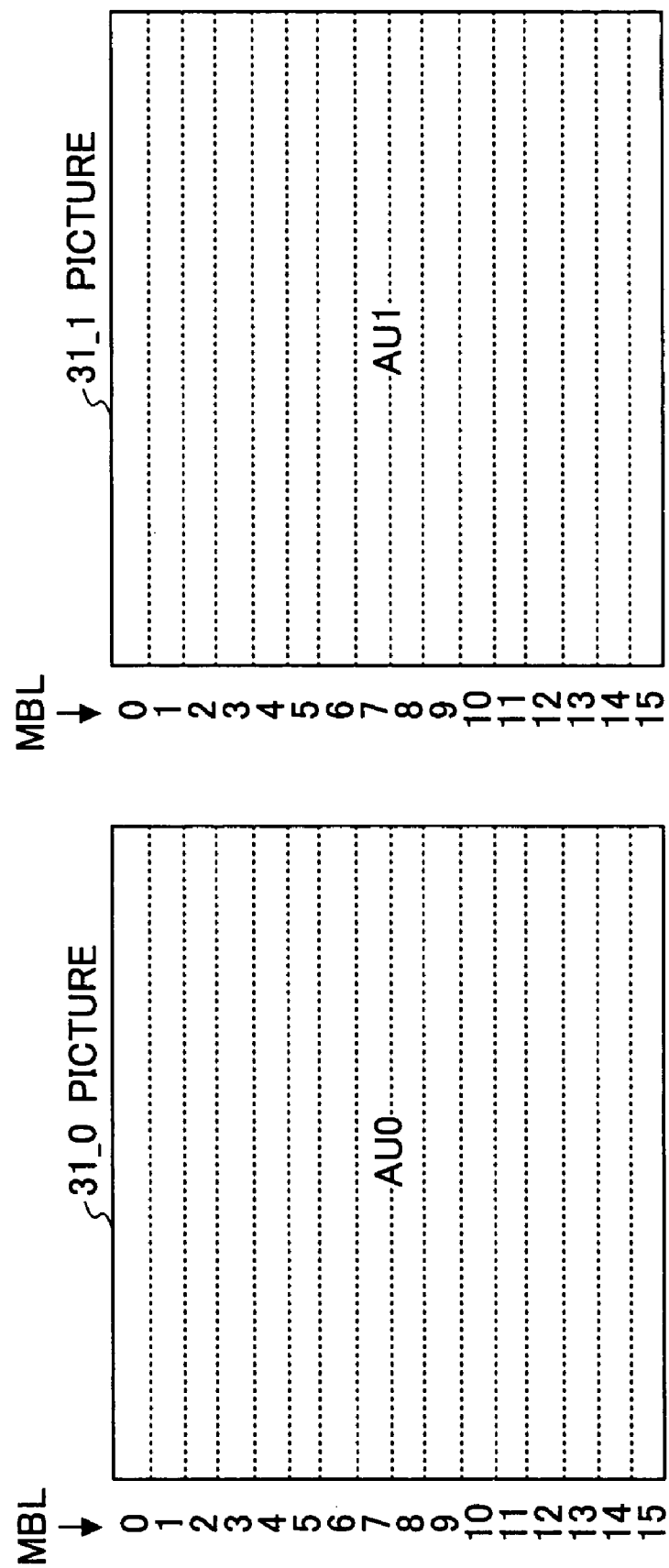

FIG.2

| MACROBLOCK LINE POINTER TABLE (38) | | | REMARKS | |
|---|---|---|---|---|
| AU NUMBER | MBL | MACRO-BLOCK LINE POINTER | WRITTEN BY | READ BY |
| 0 | 0 | AU0PTR0 | VARIABLE-LENGTH DECODING UNIT 36_0 | IMAGE DECODING UNIT 39_0 |
| | 1 | AU0PTR1 | | IMAGE DECODING UNIT 39_1 |
| | 2 | AU0PTR2 | | IMAGE DECODING UNIT 39_0 |
| | 3 | AU0PTR3 | | IMAGE DECODING UNIT 39_1 |
| | ⋮ | ⋮ | | ⋮ |
| | 12 | AU0PTR12 | | IMAGE DECODING UNIT 39_0 |
| | 13 | AU0PTR13 | | IMAGE DECODING UNIT 39_1 |
| | 14 | AU0PTR14 | | IMAGE DECODING UNIT 39_0 |
| | 15 | AU0PTR15 | | IMAGE DECODING UNIT 39_1 |
| 1 | 0 | AU1PTR0 | VARIABLE-LENGTH DECODING UNIT 36_1 | IMAGE DECODING UNIT 39_0 |
| | 1 | AU1PTR1 | | IMAGE DECODING UNIT 39_1 |
| | 2 | AU1PTR2 | | IMAGE DECODING UNIT 39_0 |
| | 3 | AU1PTR3 | | IMAGE DECODING UNIT 39_1 |
| | ⋮ | ⋮ | | ⋮ |
| | 12 | AU1PTR12 | | IMAGE DECODING UNIT 39_0 |
| | 13 | AU1PTR13 | | IMAGE DECODING UNIT 39_1 |
| | 14 | AU1PTR14 | | IMAGE DECODING UNIT 39_0 |
| | 15 | AU1PTR15 | | IMAGE DECODING UNIT 39_1 |

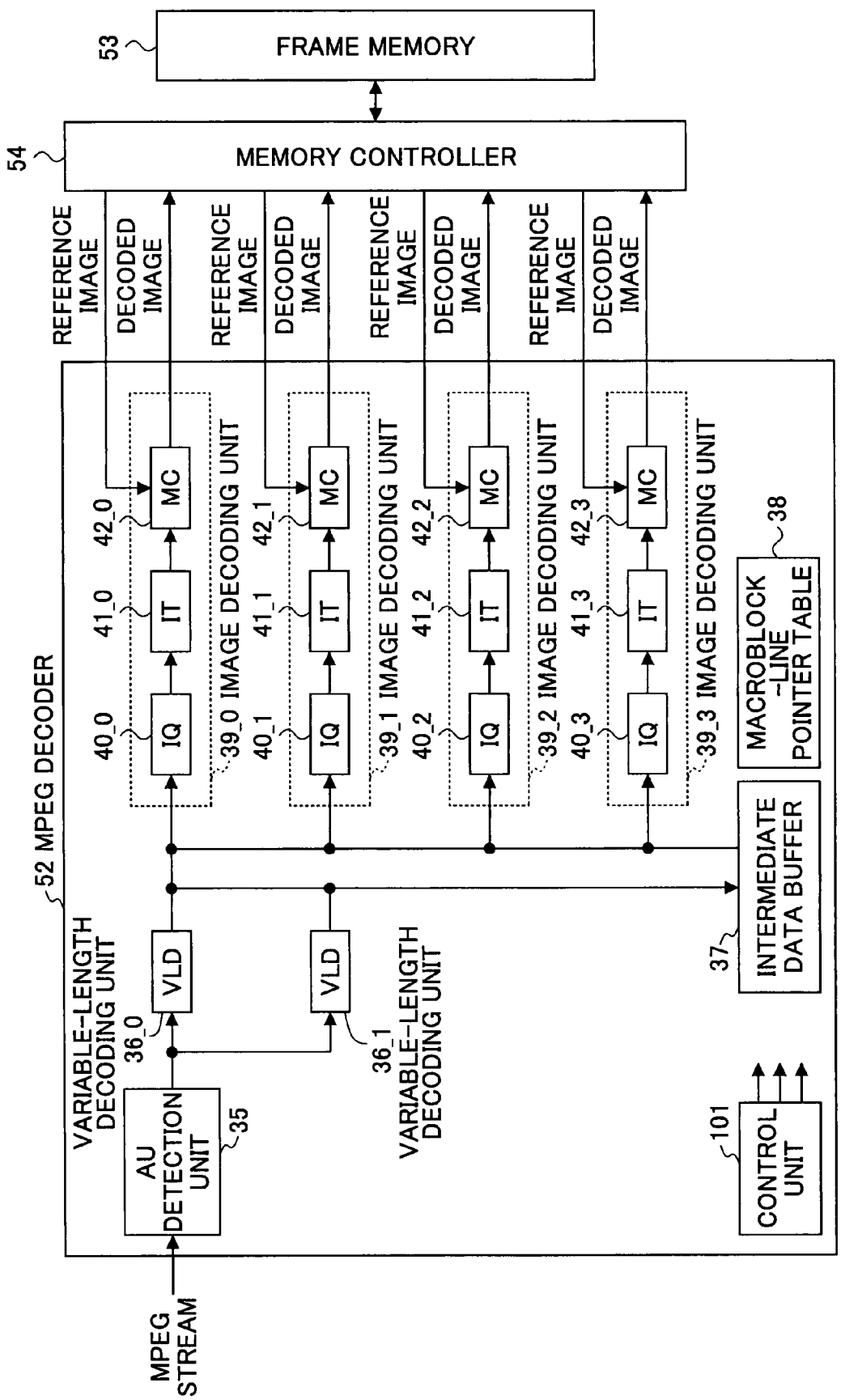

FIG.10

| MACROBLOCK LINE POINTER TABLE (38) | | | REMARKS | |
|---|---|---|---|---|
| AU NUMBER | MBL | MACRO-BLOCK LINE POINTER | WRITTEN BY | READ BY |
| 0 | 0 | AU0PTR0 | VARIABLE-LENGTH DECODING UNIT 36_0 | IMAGE DECODING UNIT 39_0 |
| | 1 | AU0PTR1 | | IMAGE DECODING UNIT 39_1 |
| | 2 | AU0PTR2 | | IMAGE DECODING UNIT 39_2 |
| | 3 | AU0PTR3 | | IMAGE DECODING UNIT 39_3 |
| | ⋮ | ⋮ | | ⋮ |
| | 12 | AU0PTR12 | | IMAGE DECODING UNIT 39_0 |
| | 13 | AU0PTR13 | | IMAGE DECODING UNIT 39_1 |
| | 14 | AU0PTR14 | | IMAGE DECODING UNIT 39_2 |
| | 15 | AU0PTR15 | | IMAGE DECODING UNIT 39_3 |
| 1 | 0 | AU1PTR0 | VARIABLE-LENGTH DECODING UNIT 36_1 | IMAGE DECODING UNIT 39_0 |
| | 1 | AU1PTR1 | | IMAGE DECODING UNIT 39_1 |
| | 2 | AU1PTR2 | | IMAGE DECODING UNIT 39_2 |
| | 3 | AU1PTR3 | | IMAGE DECODING UNIT 39_3 |
| | ⋮ | ⋮ | | ⋮ |
| | 12 | AU1PTR12 | | IMAGE DECODING UNIT 39_0 |
| | 13 | AU1PTR13 | | IMAGE DECODING UNIT 39_1 |
| | 14 | AU1PTR14 | | IMAGE DECODING UNIT 39_2 |
| | 15 | AU1PTR15 | | IMAGE DECODING UNIT 39_3 |

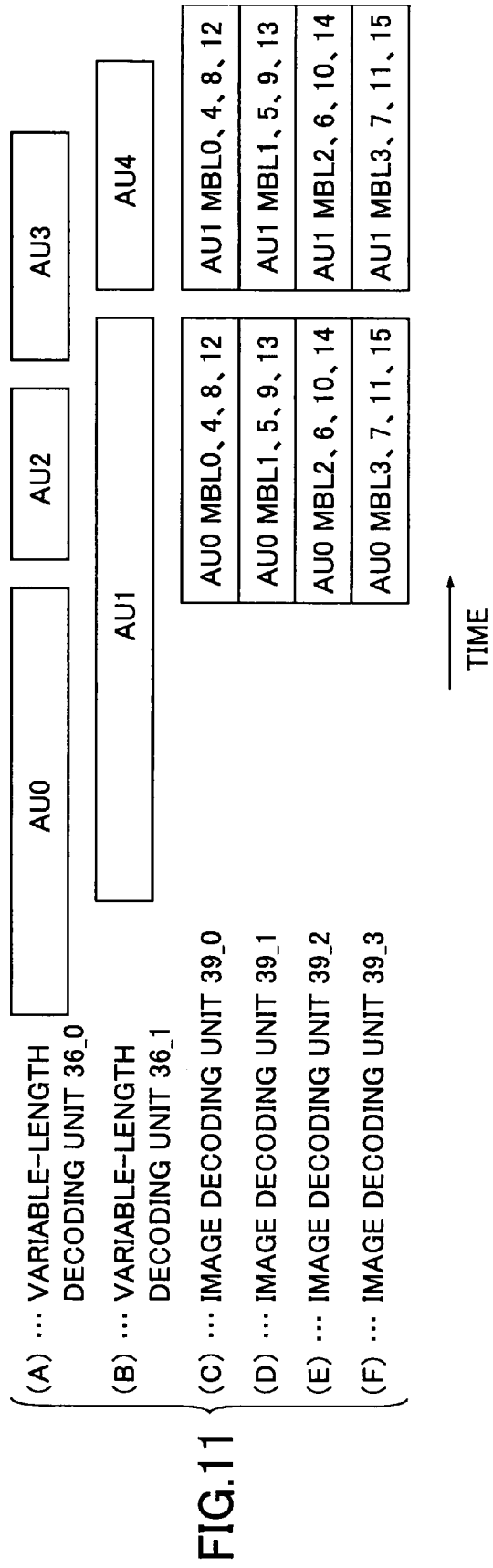

FIG.13
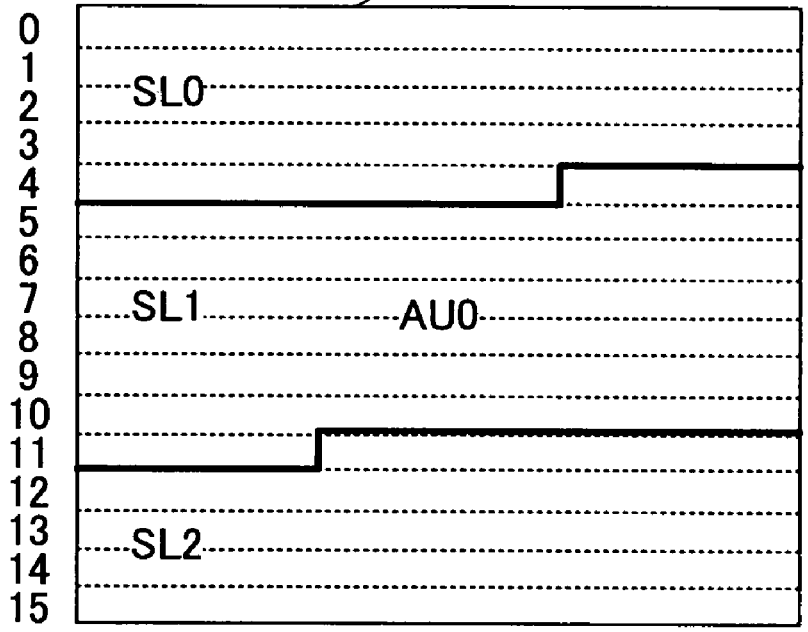
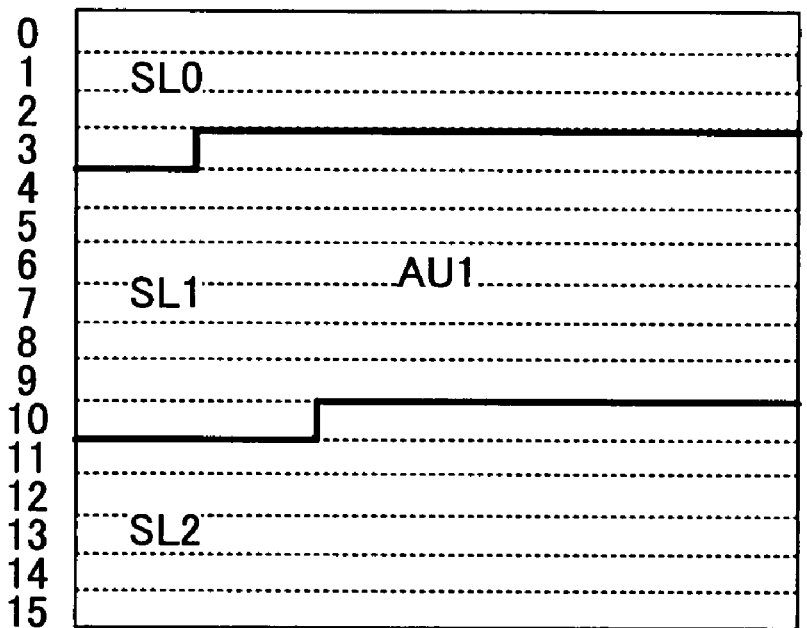

FIG.14

| MACROBLOCK LINE POINTER TABLE (68A) | | | REMARKS | |
|---|---|---|---|---|
| AU NUMBER | MBL | MACRO-BLOCK LINE POINTER | WRITTEN BY | READ BY |
| 0 | 0 | AU0PTR0 | VARIABLE -LENGTH DECODING UNIT 66_0 | IMAGE DECODING UNIT 69_0 |
|   | 1 | AU0PTR1 |   | IMAGE DECODING UNIT 69_1 |
|   | 2 | AU0PTR2 |   | IMAGE DECODING UNIT 69_0 |
|   | 3 | AU0PTR3 |   | IMAGE DECODING UNIT 69_1 |
|   | 4 | AU0PTR4 |   | IMAGE DECODING UNIT 69_0 |
|   | 5 | AU0PTR5 | VARIABLE -LENGTH DECODING UNIT 66_1 | IMAGE DECODING UNIT 69_1 |
|   | 6 | AU0PTR6 |   | IMAGE DECODING UNIT 69_0 |
|   | 7 | AU0PTR7 |   | IMAGE DECODING UNIT 69_1 |
|   | 8 | AU0PTR8 |   | IMAGE DECODING UNIT 69_0 |
|   | 9 | AU0PTR9 |   | IMAGE DECODING UNIT 69_1 |
|   | 10 | AU0PTR10 |   | IMAGE DECODING UNIT 69_0 |
|   | 11 | AU0PTR11 |   | IMAGE DECODING UNIT 69_1 |
|   | 12 | AU0PTR12 | VARIABLE -LENGTH DECODING UNIT 66_0 | IMAGE DECODING UNIT 69_0 |
|   | 13 | AU0PTR13 |   | IMAGE DECODING UNIT 69_1 |
|   | 14 | AU0PTR14 |   | IMAGE DECODING UNIT 69_0 |
|   | 15 | AU0PTR15 |   | IMAGE DECODING UNIT 69_1 |
| 1 | 0 | AU1PTR0 | VARIABLE -LENGTH DECODING UNIT 66_1 | IMAGE DECODING UNIT 69_0 |
|   | 1 | AU1PTR1 |   | IMAGE DECODING UNIT 69_1 |
|   | 2 | AU1PTR2 |   | IMAGE DECODING UNIT 69_0 |
|   | 3 | AU1PTR3 |   | IMAGE DECODING UNIT 69_1 |
|   | 4 | AU1PTR4 | VARIABLE -LENGTH DECODING UNIT 66_0 | IMAGE DECODING UNIT 69_0 |
|   | 5 | AU1PTR5 |   | IMAGE DECODING UNIT 69_1 |
|   | 6 | AU1PTR6 |   | IMAGE DECODING UNIT 69_0 |
|   | 7 | AU1PTR7 |   | IMAGE DECODING UNIT 69_1 |
|   | 8 | AU1PTR8 |   | IMAGE DECODING UNIT 69_0 |
|   | 9 | AU1PTR9 |   | IMAGE DECODING UNIT 69_1 |
|   | 10 | AU1PTR10 |   | IMAGE DECODING UNIT 69_0 |
|   | 11 | AU1PTR11 | VARIABLE -LENGTH DECODING UNIT 66_1 | IMAGE DECODING UNIT 69_1 |
|   | 12 | AU1PTR12 |   | IMAGE DECODING UNIT 69_0 |
|   | 13 | AU1PTR13 |   | IMAGE DECODING UNIT 69_1 |
|   | 14 | AU1PTR14 |   | IMAGE DECODING UNIT 69_0 |
|   | 15 | AU1PTR15 |   | IMAGE DECODING UNIT 69_1 |

FIG.15

SLICE POINTER TABLE (68B)

| AU NUMBER | SL NUMBER | SLICE POINTER | MBL | REMARKS | |
|---|---|---|---|---|---|
| | | | | WRITTEN BY | READ BY |
| 0 | 0 | AU0SL0 | 0 | VARIABLE-LENGTH DECODING UNIT 66_0 | IMAGE DECODING UNIT 69_0 |
| | 1 | AU0SL1 | 4 | VARIABLE-LENGTH DECODING UNIT 66_1 | IMAGE DECODING UNIT 69_0 |
| | 2 | AU0SL2 | 11 | VARIABLE-LENGTH DECODING UNIT 66_0 | IMAGE DECODING UNIT 69_1 |
| 1 | 0 | AU0SL0 | 0 | VARIABLE-LENGTH DECODING UNIT 66_1 | IMAGE DECODING UNIT 69_0 |
| | 1 | AU0SL1 | 3 | VARIABLE-LENGTH DECODING UNIT 66_0 | IMAGE DECODING UNIT 69_1 |
| | 2 | AU0SL2 | 10 | VARIABLE-LENGTH DECODING UNIT 66_1 | IMAGE DECODING UNIT 69_0 |

FIG.18

| IMAGE SIZE | FRAME RATE | NUMBER OF MBs / sec | BIT RATE | NUMBER OF VARIABLE-LENGTH DECODING UNITS USED | NUMBER OF IMAGE DECODING UNITS USED |
|---|---|---|---|---|---|
| 720 × 480 | 30fps | 40500 | 10Mbps | 1 | 1 |
| 720 × 480 | 60fps | 81000 | 15Mbps | 1 | 1 |
| 1280 × 720 | 30fps | 108000 | 15Mbps | 1 | 1 |
| 1280 × 720 | 60fps | 216000 | 30Mbps | 2 | 2 |
| 1440 × 1080 | 30fps | 183600 | 15Mbps | 1 | 2 |
| 1920 × 1080 | 30fps | 244800 | 25Mbps | 2 | 2 |

FIG.20

| MACROBLOCK LINE POINTER TABLE (94) | | | REMARKS | |
|---|---|---|---|---|
| AU NUMBER | MBL | MACRO-BLOCK LINE POINTER | WRITTEN BY | READ BY |
| 0 | 0 | AU0PTR0 | IMAGE ENCODING UNIT 85_0 | VARIABLE-LENGTH ENCODING UNIT 95_0 |
| 0 | 1 | AU0PTR1 | IMAGE ENCODING UNIT 85_1 | |
| 0 | 2 | AU0PTR2 | IMAGE ENCODING UNIT 85_0 | |
| 0 | 3 | AU0PTR3 | IMAGE ENCODING UNIT 85_1 | |
| 0 | ⋮ | ⋮ | ⋮ | |
| 0 | 12 | AU0PTR12 | IMAGE ENCODING UNIT 85_0 | |
| 0 | 13 | AU0PTR13 | IMAGE ENCODING UNIT 85_1 | |
| 0 | 14 | AU0PTR14 | IMAGE ENCODING UNIT 85_0 | |
| 0 | 15 | AU0PTR15 | IMAGE ENCODING UNIT 85_1 | |
| 1 | 0 | AU1PTR0 | IMAGE ENCODING UNIT 85_0 | VARIABLE-LENGTH ENCODING UNIT 95_1 |
| 1 | 1 | AU1PTR1 | IMAGE ENCODING UNIT 85_1 | |
| 1 | 2 | AU1PTR2 | IMAGE ENCODING UNIT 85_0 | |
| 1 | 3 | AU1PTR3 | IMAGE ENCODING UNIT 85_1 | |
| 1 | ⋮ | ⋮ | ⋮ | |
| 1 | 12 | AU1PTR12 | IMAGE ENCODING UNIT 85_0 | |
| 1 | 13 | AU1PTR13 | IMAGE ENCODING UNIT 85_1 | |
| 1 | 14 | AU1PTR14 | IMAGE ENCODING UNIT 85_0 | |
| 1 | 15 | AU1PTR15 | IMAGE ENCODING UNIT 85_1 | |

# MPEG DECODER AND MPEG ENCODER

CROSS-REFERENCE TO RELATED APPLICATIONS

The present application is based upon and claims the benefit of priority from the prior Japanese Patent Application No. 2006-242323 filed on Sep. 7, 2006, with the Japanese Patent Office, the entire contents of which are incorporated herein by reference.

BACKGROUND OF THE INVENTION

1. Field of the Invention

The present invention relates to an MPEG decoder for decoding an MPEG stream that is made by compressing and encoding moving pictures according to the MPEG (Moving Picture Experts Group) method, and also relates to an MPEG encoder for generating an MPEG stream by compressing and encoding moving pictures according to the MPEG method.

2. Description of the Related Art

It is necessary to provide an arrangement for parallel processing in order to improve the processing performance of MPEG decoders. In MPEG decoders, however, a processing sequence needs to be maintained due to dependencies between the variable-length decoding process, the peripheral prediction process, the inter-frame prediction process, etc. It is thus believed that parallel processing cannot easily be implemented in a straightforward manner.

There are some arrangements for parallel processing in MPEG decoders such as a parallel processing scheme at the block level (see Patent Document 1) and a parallel processing scheme at the MPEG2 slice level (see Patent Document 2). The parallel processing scheme at the block level processes blocks constituting a macroblock in a parallel manner, and the parallel processing scheme at the slice level processes slices constituting a picture in a parallel fashion.

The MPEG decoder shown in Patent Document 1 performs variable-length decoding in a serial manner with respect to the blocks, which makes it necessary to drive the variable-length decoding unit at high speed. There is thus a problem in that the operating frequency needs to be increased.

The MPEG decoder shown in Patent Document 2 utilizes the fact that an MPEG2 picture is divided into slices. Since slice-based division is not necessarily implemented in MPEG4 or H.264, however, there is a problem in that this MPEG decoder may not be able to be used in many situations.

In MPEG encoders, also, there is a need to provide an arrangement for parallel processing in order to improve processing performance. Since a processing sequence needs to be maintained due to process dependencies, however, it is believed that parallel processing cannot easily be implemented in a straightforward manner.

Accordingly, there is a need for an MPEG decoder and an MPEG encoder that can achieve high processing performance.

[Patent Document 1] Japanese Patent Application Publication No. 10-56641

[Patent Document 2] Japanese Patent Application Publication No. 11-187393

[Patent Document 3] Japanese Patent Application Publication No. 2003-32679

SUMMARY OF THE INVENTION

According to an aspect of the present invention, the invention provides a moving picture decoding apparatus, which includes one or more variable-length decoding units, a data buffer configured to store data output from the one or more variable-length decoding units, and a plurality of image decoding units configured to read the data from the data buffer and to perform image decoding with respect to the read data.

According to another aspect of the present invention, a moving picture encoding apparatus includes a plurality of image encoding units, a data buffer configured to store data output from the plurality of image encoding units, and one or more variable-length encoding units configured to read the data from the data buffer and to perform variable-length encoding with respect to the read data.

BRIEF DESCRIPTION OF THE DRAWINGS

Other objects and further features of the present invention will be apparent from the following detailed description when read in conjunction with the accompanying drawings, in which:

FIGS. 1A and 1B are drawings for explaining a first embodiment of an MPEG decoder according to the present invention;

FIG. 2 is a drawing showing an example of a macroblock-line pointer table generated by the first embodiment of an MPEG decoder according to the present invention;

FIG. 9 is a drawing for explaining a second embodiment of an MPEG decoder according to the present invention;

FIG. 10 is a drawing showing an example of a macroblock-line pointer table generated by the second embodiment of an MPEG decoder according to the present invention;

FIG. 11 is a timing chart showing an example of the operation of the second embodiment of an MPEG decoder according to the present invention;

FIG. 13 is a drawing showing an example of the division of a picture into slices;

FIG. 14 is a drawing showing an example of a macroblock-line pointer table generated by the third embodiment of an MPEG decoder according to the present invention;

FIG. 15 is a drawing showing an example of a slice pointer table generated by the third embodiment of an MPEG decoder according to the present invention;

FIG. 18 is a table showing an example in which the numbers of processing units driven are adjusted in response to a bit rate and the number of processed macroblocks in a configuration in which two variable-length decoding units and two image decoding units are provided;

FIG. 20 is a drawing showing an example of a macroblock-line pointer table generated by the embodiment of an MPEG encoder according to the present invention;

DESCRIPTION OF THE PREFERRED EMBODIMENTS

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an MPEG decoder and an MPEG encoder particularly pointed out in the specification in such full, clear, concise, and exact terms as to enable a person having ordinary skill in the art to practice the invention.

In the following, embodiments of the present invention will be described with reference to the accompanying drawings.

First Embodiment of MPEG Decoder

Figure 1B:
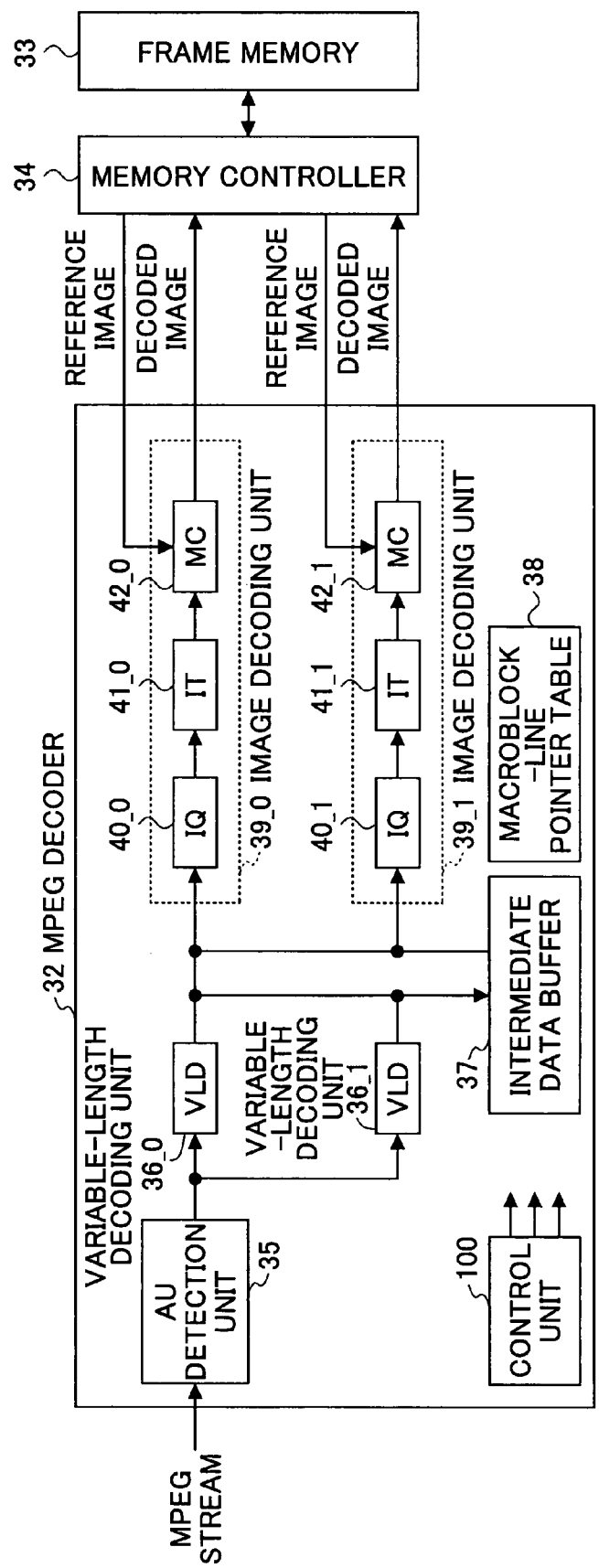

FIGS. 1A and 1B are drawings for explaining a first embodiment of an MPEG decoder according to the present invention. FIG. 1A shows consecutive pictures 31_0 and 31_1. The picture 31_0 is a picture included in a 0-th access unit AU0, and the picture 31_1 is a picture included in a 1-st access unit AU1.

FIG. 1B shows the first embodiment of an MPEG decoder according to the present invention, and this MPEG decoder 32 serves to decode an MPEG stream that is made by compressing and encoding moving pictures inclusive of the pictures 31_0 and 31_1 according to the MPEG method. A frame memory 33 stores decoded images output from the MPEG decoder 32, and a memory controller 34 controls the storing of decoded images output from the MPEG decoder 32 in the frame memory 33 and the reading of reference images from the frame memory 33.

In the MPEG decoder 32, an AU (access unit) detection unit 35 detects access units in an MPEG stream that is to be decoded. Variable-length decoding units (VLD) 36_0 and 36_1 perform variable-length decoding on an access-unit-by-access-unit basis. The number of variable-length decoding units is not limited to two, and variable-length decoding units may be provided as many as necessary for required processing performance. The number of variable-length decoding units may even be 1.

A intermediate data buffer 37 serves to store intermediate data such as coefficient data output from the variable-length decoding units 36_0 and 36_1, and a macroblock-line pointer table 38 serves to store a macroblock-line pointer indicative of the start position of data of a macroblock line stored in the intermediate data buffer 37. The intermediate data buffer 37 has a capacity for storing the data of multiple macroblock lines.

The variable-length decoding units 36_0 and 36_1 perform variable-length decoding with respect to pictures included in access units, and write intermediate data to the intermediate data buffer 37 in units of macroblock lines. In so doing, the variable-length decoding units 36_0 and 36_1 generate macroblock-line pointers for recordation in the macroblock-line pointer table 38.

An image decoding unit 39_0 reads the intermediate data of even-number macroblock lines from the intermediate data buffer 37, and performs image decoding with respect to the even-number macroblock lines, and includes an inverse quantization unit (IQ) 40_0, an inverse transformation unit (IT) 41_0, and a motion compensation unit (MC) 42_0.

An image decoding unit 39_1 reads the intermediate data of odd-number macroblock lines from the intermediate data buffer 37, and performs image decoding with respect to the odd-number macroblock lines, and includes an inverse quantization unit (IQ) 40_1, an inverse transformation unit (IT) 41_1, and a motion compensation unit (MC) 42_1.

A control unit 100 attends to the overall control of the MPEG decoder 32. Such overall control includes the management of the pointer table and the allocation of processes to the variable-length decoding units and image decoding units. Such control operations will later be described in detail.

Figure 3:
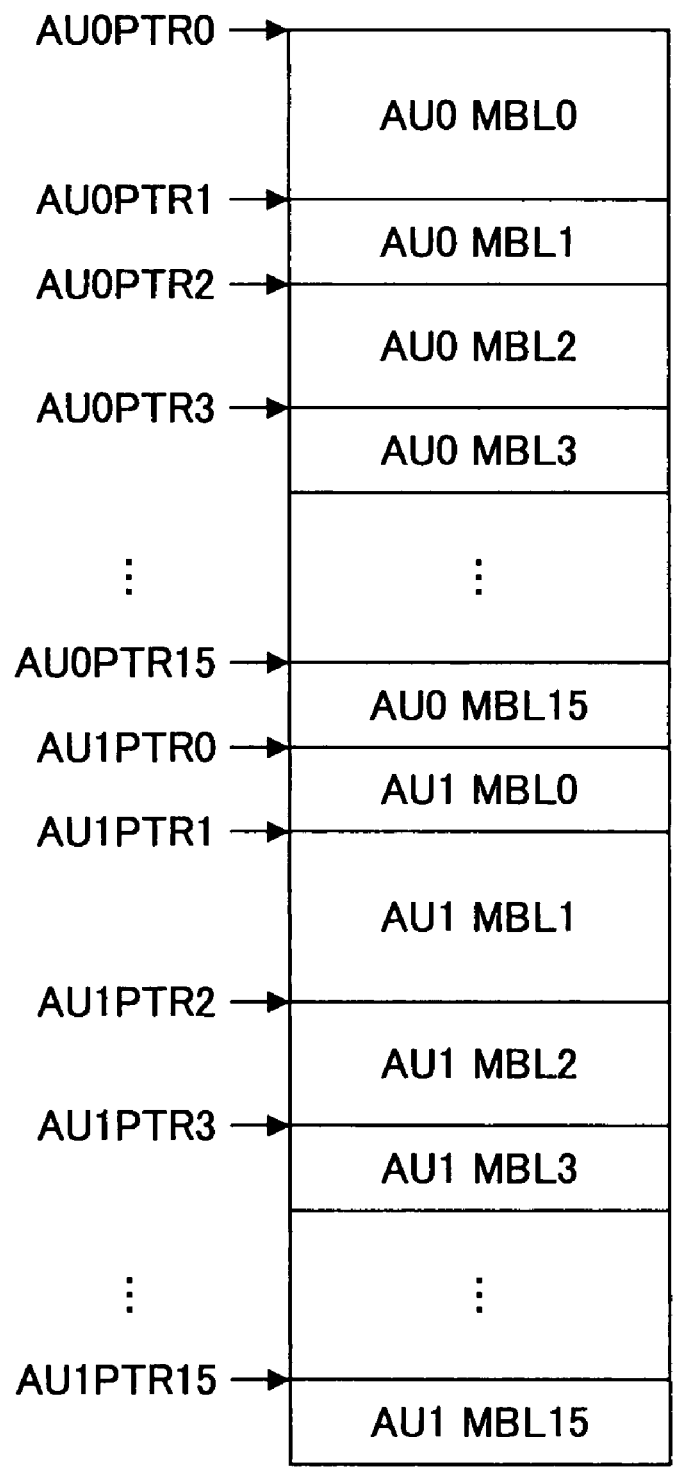
FIG. 3 is a drawing showing the relationship between macroblock-line pointers and intermediate data corresponding to the macroblock-line pointer table shown in FIG. 2.

FIG. 2 is a drawing showing an example of the macroblock-line pointer table 38. FIG. 3 is a drawing showing the relationship between macroblock-line pointers and intermediate data corresponding to the macroblock-line pointer table 38 shown in FIG. 2. In FIG. 2, the column shown as "REMARKS" is provided only for the purpose of explanation, and is not actually the contents of the macroblock-line pointer table 38.

In FIG. 2 and FIG. 3, macroblock-line pointers AU0PTRi and AU1PTRi (i=0, 1, . . . , 15) are shown. The macroblock-line pointer AU0PTRi points to the data start position in the intermediate data buffer 37 of a macroblock line MBLi of a picture included in the access unit AU0. The macroblock-line pointer AU1PTRi points to the data start position in the intermediate data buffer 37 of a macroblock line MBLi of a picture included in the access unit AU1.

In this example, the variable-length decoding unit 36_0 performs variable-length decoding with respect to a picture included in the access unit AU0, and write intermediate data to the intermediate data buffer 37 in units of macroblock lines. In so doing, the variable-length decoding unit 36_0 generates macroblock-line pointers AU0PTRi for recordation in the macroblock-line pointer table 38.

Further, the variable-length decoding unit 36_1 performs variable-length decoding with respect to a picture included in the access unit AU1, and write intermediate data to the intermediate data buffer 37 in units of macroblock lines. In so doing, the variable-length decoding unit 36_1 generates macroblock-line pointers AU1PTRi for recordation in the macroblock-line pointer table 38.

In this example, further, the image decoding unit 39_0 is set as the unit to read even-number macroblock-line pointers AU0PTR0, AU0PTR2, . . . , AU0PTR14, AU1PTR0, AU1PTR2, . . . , and AU1PTR14 from the macroblock-line pointer table 38, and the image decoding unit 39_1 is set as the unit to read odd-number macroblock-line pointers AU0PTR1, AU0PTR3, ..., AU0PTR15, AU1PTR1, AU1PTR3, ..., and AU1PTR15 from the macroblock-line pointer table 38.

The image decoding unit 39_0 acquires the value of the macroblock-line pointer AU0PTR0 from the macroblock-line pointer table 38, and reads the intermediate data of the macroblock line MBL0 of a picture included in the access unit AU0 from the intermediate data buffer 37 at the data position indicated by the macroblock-line pointer AU0PTR0. The image decoding unit 39_0 performs image decoding with respect to the macroblock line MBL0.

Upon completing the image decoding of the macroblock line MBL0 of the picture included in the access unit AU0, the image decoding unit 39_0 acquires the value of the macroblock-line pointer AU0PTR2, and reads the intermediate data of the macroblock line MBL2 from the intermediate data buffer 37 at the data position indicated by the macroblock-line pointer AU0PTR2. The image decoding unit 39_0 performs image decoding with respect to the macroblock line MBL2. Decoding of even-number macroblock lines thereafter continues in the same manner.

The image decoding unit 39_1 acquires the value of the macroblock-line pointer AU0PTR1 from the macroblock-line pointer table 38, and reads the intermediate data of the macroblock line MBL1 of a picture included in the access unit AU0 from the intermediate data buffer 37 at the data position indicated by the macroblock-line pointer AU0PTR1. The image decoding unit 39_1 performs image decoding with respect to the macroblock line MBL1.

Upon completing the image decoding of the macroblock line MBL1 of the picture included in the access unit AU0, the image decoding unit 39_1 acquires the value of the macroblock-line pointer AU0PTR3, and reads the intermediate data of the macroblock line MBL3 from the intermediate data buffer 37 at the data position indicated by the macroblock-line pointer AU0PTR3. The image decoding unit 39_1 performs image decoding with respect to the macroblock line MBL3. Decoding of odd-number macroblock lines thereafter continues in the same manner.

Figure 4:
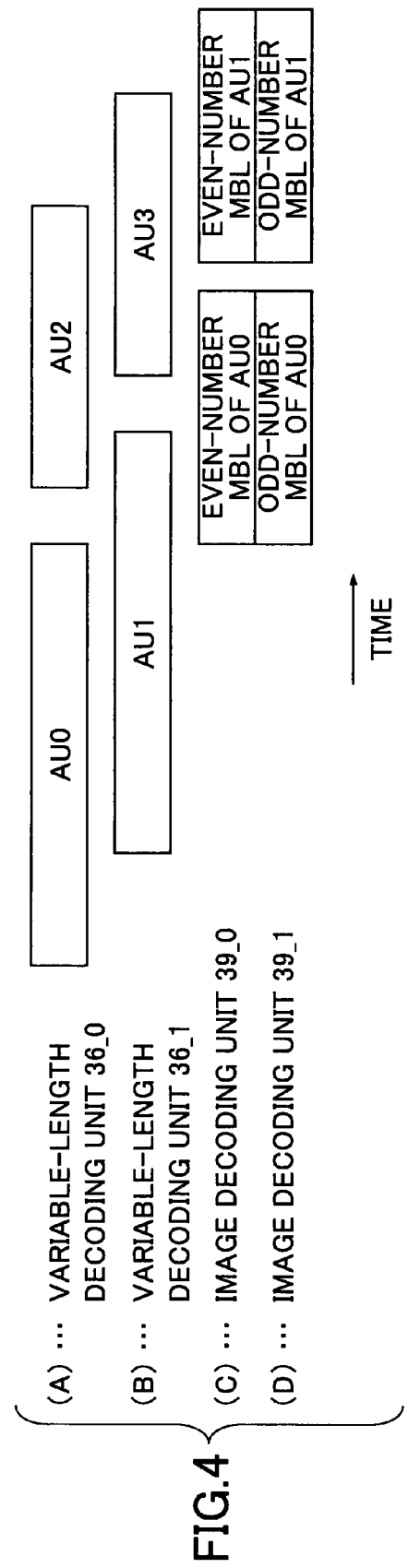
FIG. 4 is a timing chart showing an example of the operation of the first embodiment of an MPEG decoder according to the present invention.

FIG. 4 is a timing chart showing an example of the operation of the MPEG decoder 32 that is the first embodiment of an MPEG decoder according to the present invention. A letter designation (A) shows processing by the variable-length decoding unit 36_0, a letter destination (B) showing processing by the variable-length decoding unit 36_1, a letter designation (C) showing processing by the image decoding unit 39_0, and a letter designation (D) showing processing by the image decoding unit 39_1.

In this example, the variable-length decoding unit 36_0 performs variable-length decoding with respect to the picture of the access unit AU0 that is first detected by the AU detection unit 35, and the variable-length decoding unit 36_1 performs variable-length decoding with respect to the picture of the access unit AU1 that is detected after the access unit AU0 by the AU detection unit 35. The variable-length decoding of the picture of the access unit AU0 performed by the variable-length decoding unit 36_0 is completed before the variable-length decoding of the picture of the access unit AU1 performed by the variable-length decoding unit 36_1.

The variable-length decoding unit 36_0 performs variable-length decoding with respect to the picture of an access unit AU2 that is detected after the access unit AU1 by the AU detection unit 35, and the variable-length decoding unit 36_1 performs variable-length decoding with respect to the picture of an access unit AU3 that is detected after the access unit AU2 by the AU detection unit 35.

In this example, upon the completion of the variable-length decoding of the picture of the access unit AU0 performed by the variable-length decoding unit 36_0, the image decoding unit 39_0 starts performing the image decoding of the even-number macroblock lines of the picture of the access unit AU0, and the image decoding unit 39_1 starts performing the image decoding of the odd-number macroblock lines of the picture of the access unit AU0.

Subsequently, the image decoding of the even-number macroblock lines of the picture of the access unit AU0 performed by the image decoding unit 39_0 comes to an end, and the image decoding of the odd-number macroblock lines of the picture of the access unit AU0 performed by the image decoding unit 39_1 comes to an end. After this, the image decoding unit 39_0 starts performing the image decoding of the even-number macroblock lines of the picture of the access unit AU1, and the image decoding unit 39_1 starts performing the image decoding of the odd-number macroblock lines of the picture of the access unit AU1.

Figure 5:
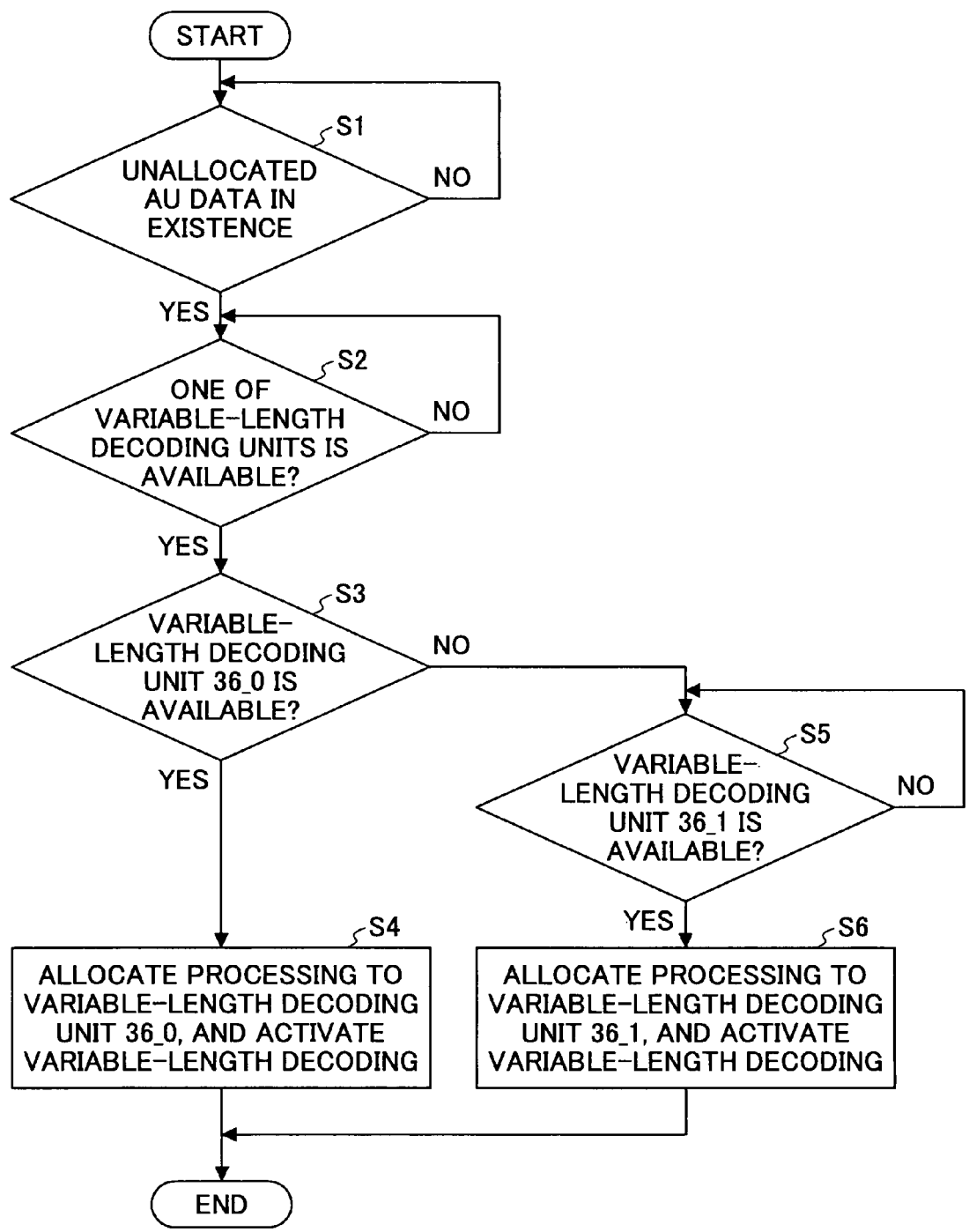
FIG. 5 is a flowchart showing a control procedure for allocating AU processing to variable-length decoding units.

FIG. 5 is a flowchart showing a control procedure for allocating AU processing to variable-length decoding units. The allocation of AU processing to the two variable-length decoding units is controlled by the control unit 100.

A check is made as to whether there is unallocated AU data that needs to be processed (step S1). When the preparation of AU data is not yet done, the completion of such preparation is awaited. Upon the completion of preparation of AU data, a check is made whether either one of the variable-length decoding units 36_0 and 36_1 is available (step S2). If both are being used, the control unit 100 waits. If the variable-length decoding unit 36_0 is available (YES at step S3), processing is allocated to the variable-length decoding unit 36_0 (step S4). If the variable-length decoding unit 36_0 is not available (NO at step S3), processing is allocated to the variable-length decoding unit 36_1 (step S6). In this manner, each of the variable-length decoding units is assigned with AU to be processed under the control of the control unit 100, so that the variable-length decoding units read respective AU data and perform variable-length decoding according to the settings made by the control unit 100.

Figure 6:
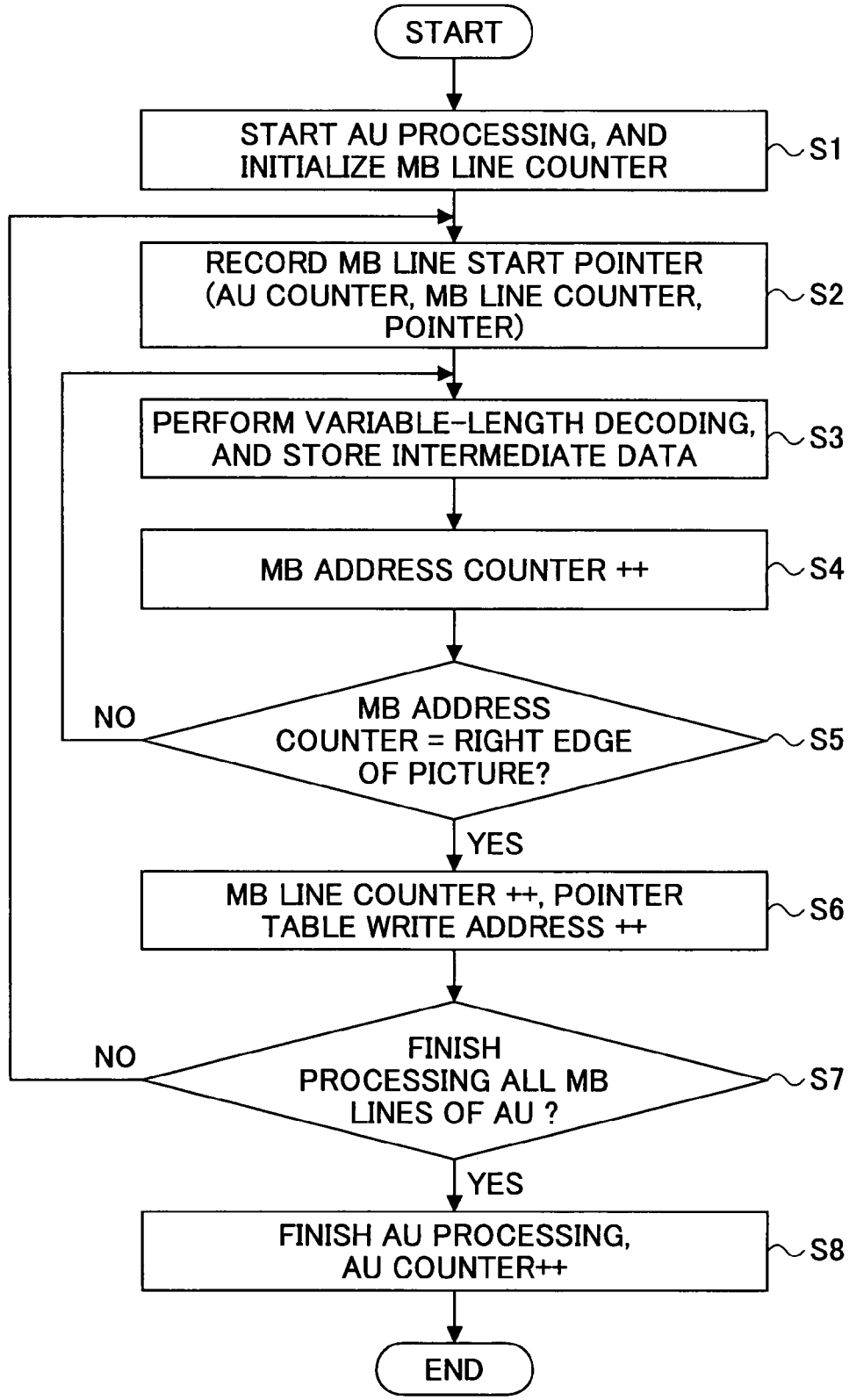
FIG. 6 is a flowchart showing the process of generating pointers performed by a variable-length decoding unit.

FIG. 6 is a flowchart showing the process of generating pointers performed by a variable-length decoding unit.

At the start of an AU, an MB line counter is initialized to zero (step S1). A write pointer for the intermediate data buffer that is in existence at the start of processing of a given MB line (i.e., macroblock line) is recorded in such a manner that it is associated with the AU number indicated by an AU counter and the MB line number indicated by the MB line counter (step S2).

Variable-length decoding and the storing of intermediate data are performed in units of MBs (step S3). An MB address counter counts up each time one macroblock is processed (step S4). The write pointer for the intermediate data buffer is successively incremented in conjunction with the writing of intermediate data generated by the variable-length decoding. When the MB address reaches the right-hand-side edge of the picture (YES at step S5), the completion of processing of the current MB line is detected, so that the MB line counter and the write address for the macroblock-line pointer table are incremented (step S6). When all the MB lines included in one AU are processed (YES at step S7), the processing of the current AU comes to an end, and the AU counter counts up (step S8).

Figure 7:
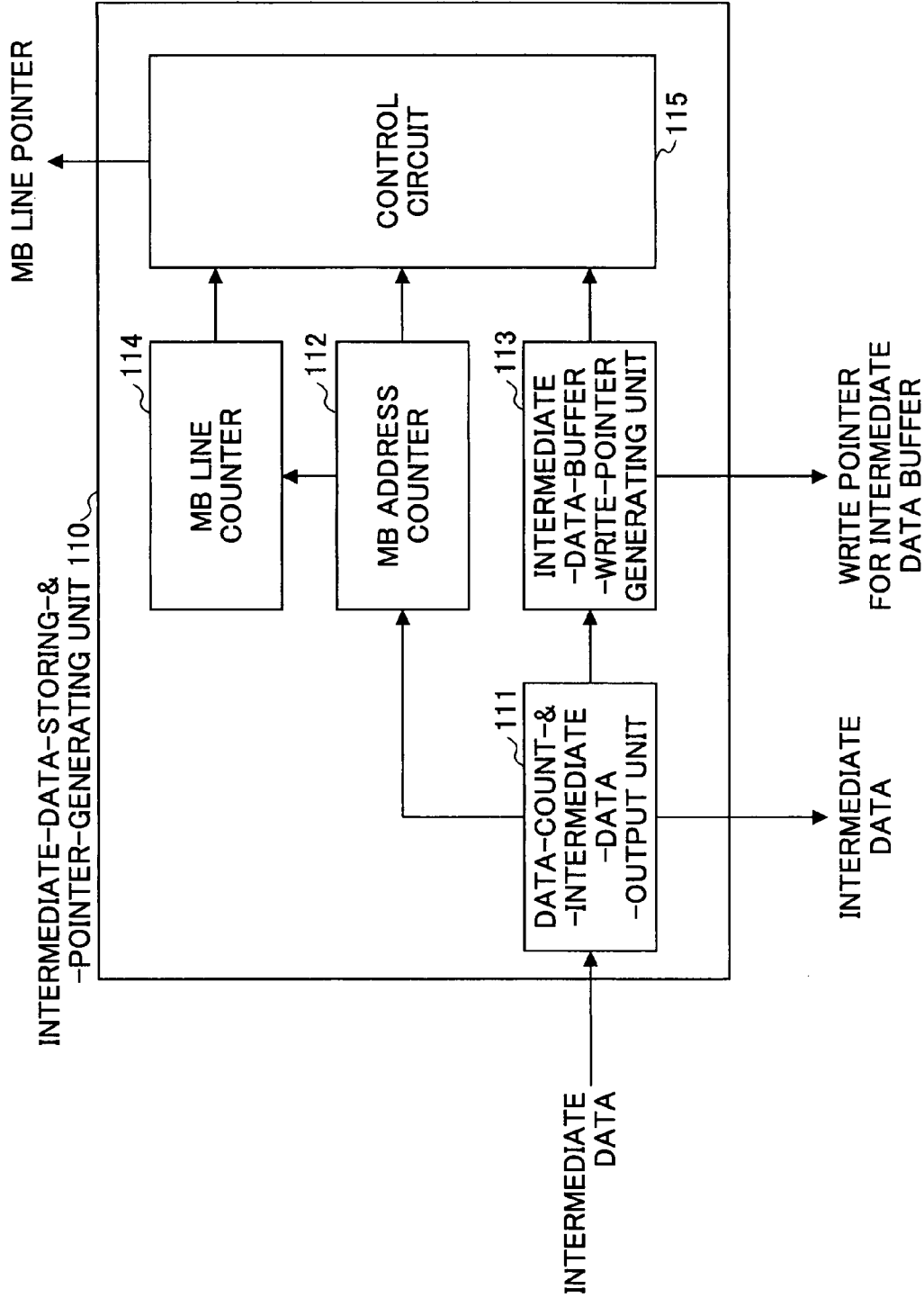
FIG. 7 is a drawing showing an example of the configuration of an intermediate-data-storing-&-pointer-generating unit.

FIG. 7 is a drawing showing an example of the configuration of an intermediate-data-storing-&-pointer-generating unit. An intermediate-data-storing-&-pointer-generating unit 110 shown in FIG. 7 is included in each of the variable-length decoding units 36_0 and 36_1, and performs the process of generating pointers as described in connection with FIG. 6. The intermediate-data-storing-&-pointer-generating unit 110 controls the storing of intermediate data, and generates macroblock-line pointers.

A data-count-&-intermediate-data-output unit 111 of the intermediate-data-storing-&-pointer-generating unit 110 receives the decoded data of each macroblock as intermediate data, and counts the amount of the received data. Based on the count obtained by the data-count-&-intermediate-data-output unit 111, an intermediate-data-buffer-write-pointer generating unit 113 generates a write pointer for the intermediate data buffer. The decoded data of each macroblock output from the data-count-&-intermediate-data-output unit 111 is written to the intermediate data buffer in the format of intermediate data at the position indicated by the write pointer output from the intermediate-data-buffer-write-pointer generating unit 113. An MB address counter 112 counts the number of macroblocks to generate an MB address. At some point in time, the MB address indicated by the MB address counter 112 reaches the value corresponding to the right-hand-side edge of the picture that is known based on the horizontal size of the decoded picture, which indicates the processing of the last macroblock in the current macroblock line. When the writing of the intermediate data of this last macroblock is completed, it marks the completion of the processing of the current MB line. Upon the completion of the processing of the current MB line, an MB line counter 114 counts up. The write pointer that is in existence at the start of next processing is the pointer that will indicate the start of the next MB line. An MB-line-pointer generating unit 115 stores this write pointer for the intermediate data buffer as a macroblock-line pointer in the macroblock-line pointer table, such that it is associated with the MB line count.

Figure 8:
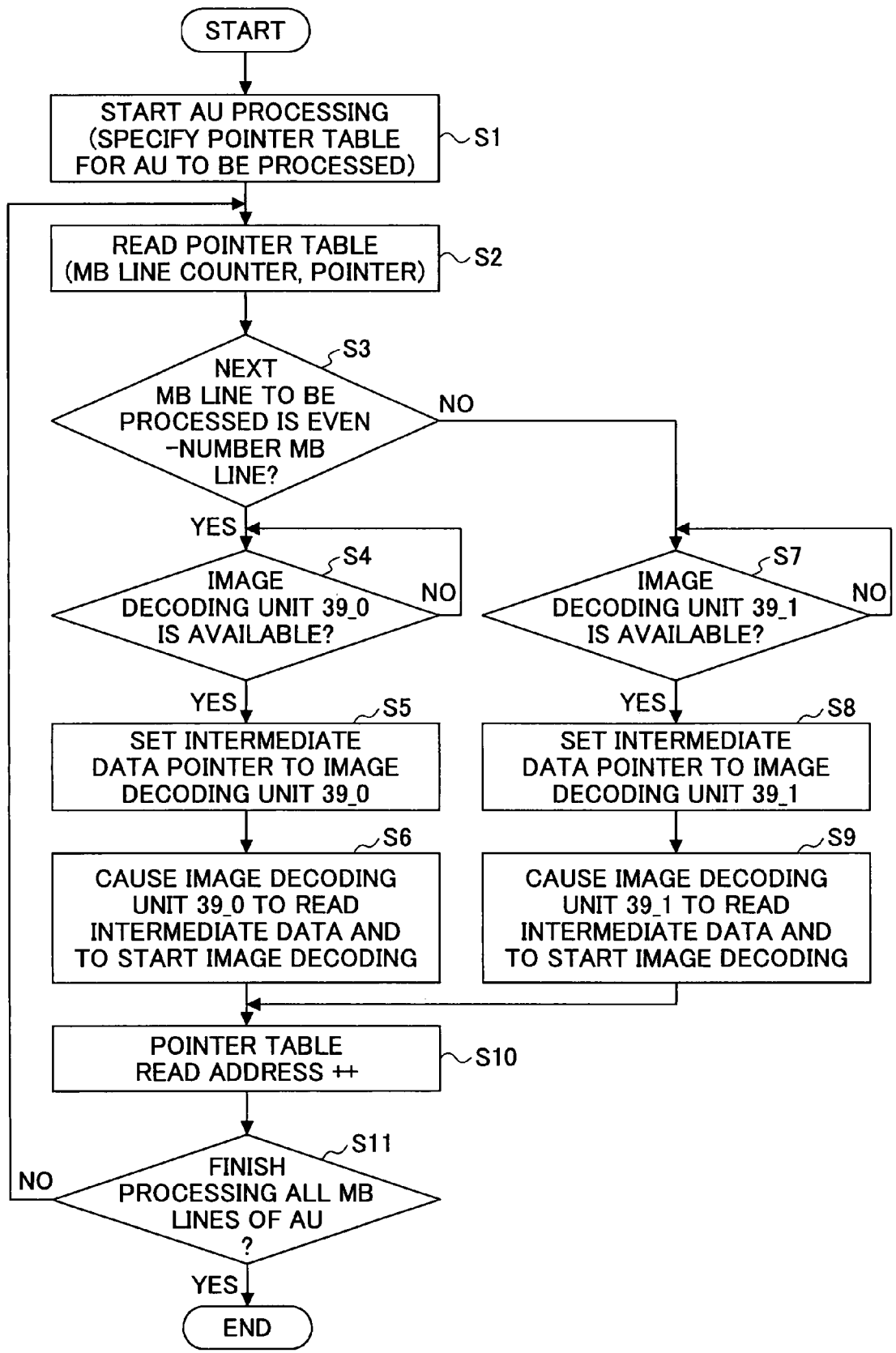
FIG. 8 is a flowchart showing the process of setting pointers to the image decoding units.

FIG. 8 is a flowchart showing the process of setting pointers to the image decoding units. The control unit 100 identifies a pointer table corresponding to the AU number of the AU to be processed at the start of AU processing (step S1), and then reads the pointer table (step S2). Successively reading the entries of the pointer table, the control unit 100 performs the setting of the image decoding unit 39_0 if the MB line number is an even number (YES at step S3), and performs the setting of the image decoding unit 39_1 if the MB line number is an odd number (NO at step S3).

The MB line number of the first entry for a given AU is 0, which is an even number, so that the setting of the image decoding unit 39_0 will be performed. If the image decoding unit 39_0 is not available (NO at step S4), the completion of the ongoing processing is awaited. If the image decoding unit 39_0 is available (YES at step S4), the control unit 100 sets to the image decoding unit 39_0 a pointer indicative of the read start point of intermediate data of the MB line to be processed (step S5), and activates the processing of the image decoding unit 39_0 (step S6). Then, the read address for the pointer table is incremented as preparation for next processing (step S10), and a next entry is read (step S2). Since the MB line number of this next entry is an odd number, the setting of the image decoding unit 39_1 is performed in the same manner (steps S7, S8, and S9). Even numbers and odd numbers are alternately read as the MB line number, so that the decoding tasks are alternately allocated to the image decoding units 39_0 and 39_1. When all the MB lines in the current AU are processed (YES at step S11), the processing of the current AU comes to an end.

In the MPEG decoder 32 as described above that is the first embodiment of an MPEG decoder according to the present invention, parallel processing at the macroblock line level is performed with respect to the image decoding by the image decoding units 39_0 and 39_1 similarly to the manner in which the related-art MPEG decoder 2 operates. Unlike the related-art MPEG decoder 2, however, the MPEG decoder 32 is also configured such that the variable-length decoding units 36_0 and 36_1 and image decoding units 39_0 and 39_1 are provided with the intermediate data buffer 37 situated therebetween. With this arrangement, parallel processing at the picture level is performed by the variable-length decoding units 36_0 and 36_1 while synchronizing the processing of the image decoding units 39_0 and 39_1 with the processing of the variable-length decoding units 36_0 and 36_1.

As a result, even when the operating frequency of each of the variable-length decoding units 36_0 and 36_1 is set equal to that of the related-art MPEG decoder 2, the speed of variable-length decoding can be increased by the parallel processing at the picture level performed by the variable-length decoding units 36_0 and 36_1. The MPEG decoder 32 can thus achieve high processing performance without increasing the overall operating frequency.

Second Embodiment of MPEG Decoder

FIG. 9 is a drawing for explaining a second embodiment of an MPEG decoder according to the present invention. FIG. 9 shows an MPEG decoder 52 that is the second embodiment of an MPEG decoder according to the present invention. In FIG. 9, a frame memory 53 stores decoded images output from the MPEG decoder 52, and a memory controller 54 controls the storing of decoded images output from the MPEG decoder 52 in the frame memory 53 and the reading of reference images from the frame memory 53.

The MPEG decoder 52 has the same configuration as the MPEG decoder 32 shown in FIG. 1B that is the first embodiment of an MPEG decoder according to the present invention, except that four image decoding units 39_0 through 39_3 are provided. The image decoding units 39_0 through 39_3 include inverse quantization units (IQ) 40_0 through 40_3, inverse transformation units (IT) 41_0 through 41_3, and motion compensation units (MC) 42_0 through 42_3, respectively.

A control unit 101 attends to the overall control of the MPEG decoder 52. Such overall control includes the management of the pointer table and the allocation of processes to the variable-length decoding units and image decoding units. These control operations performed by the control unit 101 are substantially the same as the control operations performed by the control unit 100.

FIG. 10 is a drawing showing an example of the macroblock-line pointer table 38 of the MPEG decoder 52 that is the second embodiment of an MPEG decoder according to the present invention. In FIG. 10, the column shown as "REMARKS" is provided only for the purpose of explanation, and is not actually the contents of the macroblock-line pointer table 38. In this example, the variable-length decoding unit 36_0 performs variable-length decoding with respect to a picture included in the access unit AU0, and write intermediate data to the intermediate data buffer 37 in units of macroblock lines. In so doing, the variable-length decoding unit 36_0 generates macroblock-line pointers AU0PTRi for recordation in the macroblock-line pointer table 38.

Further, the variable-length decoding unit 36_1 performs variable-length decoding with respect to a picture included in the access unit AU1, and write intermediate data to the intermediate data buffer 37 in units of macroblock lines. In so doing, the variable-length decoding unit 36_1 generates macroblock-line pointers AU1PTRi for recordation in the macroblock-line pointer table 38.

In this example, the image decoding unit 39_0 is set as the unit to read macroblock-line pointers AU0PTR0, AU0PTR4, AU0PTR8, AU0PTR12, AU1PTR0, AU1PTR4, AU1PTR8, and AU1PTR12 from the macroblock-line pointer table 38.

The image decoding unit 39_1 is set as the unit to read macroblock-line pointers AU0PTR1, AU0PTR5, AU0PTR9, AU0PTR13, AU1PTR1, AU1PTR5, AU1PTR9, and AU1PTR13 from the macroblock-line pointer table 38.

The image decoding unit 39_2 is set as the unit to read macroblock-line pointers AU0PTR2, AU0PTR6, AU0PTR10, AU0PTR14, AU1PTR2, AU1PTR6, AU1PTR10, and AU1PTR14 from the macroblock-line pointer table 38.

The image decoding unit 39_3 is set as the unit to read macroblock-line pointers AU0PTR3, AU0PTR7, AU0PTR11, AU0PTR15, AU1PTR3, AU1PTR7, AU1PTR11, and AU1PTR15 from the macroblock-line pointer table 38.

The image decoding unit 39_0 acquires the value of the macroblock-line pointer AU0PTR0 from the macroblock-line pointer table 38, and reads the intermediate data of the macroblock line MBL0 of a picture included in the access unit AU0 from the intermediate data buffer 37 at the data position indicated by the macroblock-line pointer AU0PTR0. The image decoding unit 39_0 performs image decoding with respect to the macroblock line MBL0.

Upon completing the image decoding of the macroblock line MBL0 of the picture included in the access unit AU0, the image decoding unit 39_0 acquires the value of the macroblock-line pointer AU0PTR4, and reads the intermediate data of the macroblock line MBL4 from the intermediate data buffer 37 at the data position indicated by the macroblock-line pointer AU0PTR4. The image decoding unit 39_0 performs image decoding with respect to the macroblock line MBL4. Decoding of the macroblock lines MBL8, MBL12, and so on thereafter continues in the same manner.

The image decoding unit 39_1 acquires the value of the macroblock-line pointer AU0PTR1 from the macroblock-line pointer table 38, and reads the intermediate data of the macroblock line MBL1 of a picture included in the access unit AU0 from the intermediate data buffer 37 at the data position indicated by the macroblock-line pointer AU0PTR1. The image decoding unit 39_1 performs image decoding with respect to the macroblock line MBL1.

Upon completing the image decoding of the macroblock line MBL1 of the picture included in the access unit AU0, the image decoding unit 39_1 acquires the value of the macroblock-line pointer AU0PTR5, and reads the intermediate data of the macroblock line MBL5 from the intermediate data buffer 37 at the data position indicated by the macroblock-line pointer AU0PTR5. The image decoding unit 39_1 performs image decoding with respect to the macroblock line MBL5. Decoding of the macroblock lines MBL9, MBL13, and so on thereafter continues in the same manner.

The image decoding unit 39_2 acquires the value of the macroblock-line pointer AU0PTR2 from the macroblock-line pointer table 38, and reads the intermediate data of the macroblock line MBL2 of a picture included in the access unit AU0 from the intermediate data buffer 37 at the data position indicated by the macroblock-line pointer AU0PTR2. The image decoding unit 39_2 performs image decoding with respect to the macroblock line MBL2.

Upon completing the image decoding of the macroblock line MBL2 of the picture included in the access unit AU0, the image decoding unit 39_2 acquires the value of the macroblock-line pointer AU0PTR6, and reads the intermediate data of the macroblock line MBL6 from the intermediate data buffer 37 at the data position indicated by the macroblock-line pointer AU0PTR6. The image decoding unit 39_2 performs image decoding with respect to the macroblock line MBL6. Decoding of the macroblock lines MBL10, MBL14, and so on thereafter continues in the same manner.

The image decoding unit 39_3 acquires the value of the macroblock-line pointer AU0PTR3 from the macroblock-line pointer table 38, and reads the intermediate data of the macroblock line MBL3 of a picture included in the access unit AU0 from the intermediate data buffer 37 at the data position indicated by the macroblock-line pointer AU0PTR3. The image decoding unit 39_3 performs image decoding with respect to the macroblock line MBL3.

Upon completing the image decoding of the macroblock line MBL3 of the picture included in the access unit AU0, the image decoding unit 39_3 acquires the value of the macroblock-line pointer AU0PTR7, and reads the intermediate data of the macroblock line MBL7 from the intermediate data buffer 37 at the data position indicated by the macroblock-line pointer AU0PTR7. The image decoding unit 39_3 performs image decoding with respect to the macroblock line MBL7. Decoding of the macroblock lines MBL11, MBL15, and so on thereafter continues in the same manner.

FIG. 11 is a timing chart showing an example of the operation of the MPEG decoder 52 that is the second embodiment of an MPEG decoder according to the present invention. A letter designation (A) shows processing by the variable-length decoding unit 36_0, a letter destination (B) showing processing by the variable-length decoding unit 36_1, a letter designation (C) showing processing by the image decoding unit 39_0, a letter designation (D) showing processing by the image decoding unit 39_1, a letter designation (E) showing processing by the image decoding unit 39_2, and a letter designation (F) showing processing by the image decoding unit 39_3.

In this example, the variable-length decoding unit 36_0 starts performing variable-length decoding with respect to the picture of the access unit AU0 that is first detected by the AU detection unit 35, and the variable-length decoding unit 36_1 starts performing variable-length decoding with respect to the picture of the access unit AU1 that is detected after the access unit AU0 by the AU detection unit 35.

Thereafter, the variable-length decoding unit 36_0 completes the variable-length decoding of the picture of the access unit AU0 before the variable-length decoding unit 36_1 completes the variable-length decoding of the picture of the access unit AU1. The variable-length decoding unit 36_0 thus starts performing variable-length decoding with respect to the picture of the access unit AU2 that is output from the AU detection unit 35 after the access unit AU1.

Thereafter, the variable-length decoding unit 36_0 completes the variable-length decoding of the picture of the access unit AU2 before the variable-length decoding unit 36_1 completes the variable-length decoding of the picture of the access unit AU1. The variable-length decoding unit 36_0 thus starts performing variable-length decoding with respect to the picture of the access unit AU3 that is output from the AU detection unit 35 after the access unit AU2.

Thereafter, the variable-length decoding unit 36_1 completes the variable-length decoding of the picture of the access unit AU1. The variable-length decoding unit 36_1 thus starts performing variable-length decoding with respect to the picture of the access unit AU4 that is output from the AU detection unit 35 after the access unit AU3.

In this example, upon the completion of the variable-length decoding of the picture contained in the access unit AU0 by the variable-length decoding unit 36_0, the image decoding units 39_0 through 39_3 start performing image decoding with respect to the macroblock lines MBL0, MBL1, MBL2, and MBL3, respectively, of the picture of the access unit AU0.

After this, the variable-length decoding of the picture of the access unit AU1 performed by the variable-length decoding unit 36_1 is completed, and the image decoding of the macroblock lines MBL12, MBL13, MBL14, and MBL15 of the picture of the access unit AU0 performed by the image decoding units 39_0 through 39_3, respectively, comes to an end.

In this instance, the image decoding units 39_0, 39_1, 39_2, and 39_3 start performing image decoding with respect to the macroblock lines MBL0, MBL1, MBL2, and MBL3, respectively, of the picture of the access unit AU1.

In the MPEG decoder 52 as described above that is the second embodiment of an MPEG decoder according to the present invention, parallel processing at the macroblock line level is performed with respect to the image decoding by the four image decoding units 39_0 through 39_3, and the variable-length decoding units 36_0 and 36_1 and image decoding units 39_0 through 39_3 are provided with the intermediate data buffer 37 situated therebetween. With this arrangement, parallel processing at the picture level is performed by the variable-length decoding units 36_0 and 36_1 while synchronizing the processing of the image decoding units 39_0 through 39_3 with the processing of the variable-length decoding units 36_0 and 36_1.

As a result, even when the operating frequency of each of the variable-length decoding units 36_0 and 36_1 is set equal to that of the related-art MPEG decoder 2, the speed of variable-length decoding can be increased by the parallel processing at the picture level performed by the variable-length decoding units 36_0 and 36_1. The MPEG decoder 52 can thus achieve high processing performance without increasing the overall operating frequency.

Third Embodiment of MPEG Decoder

Figure 12:
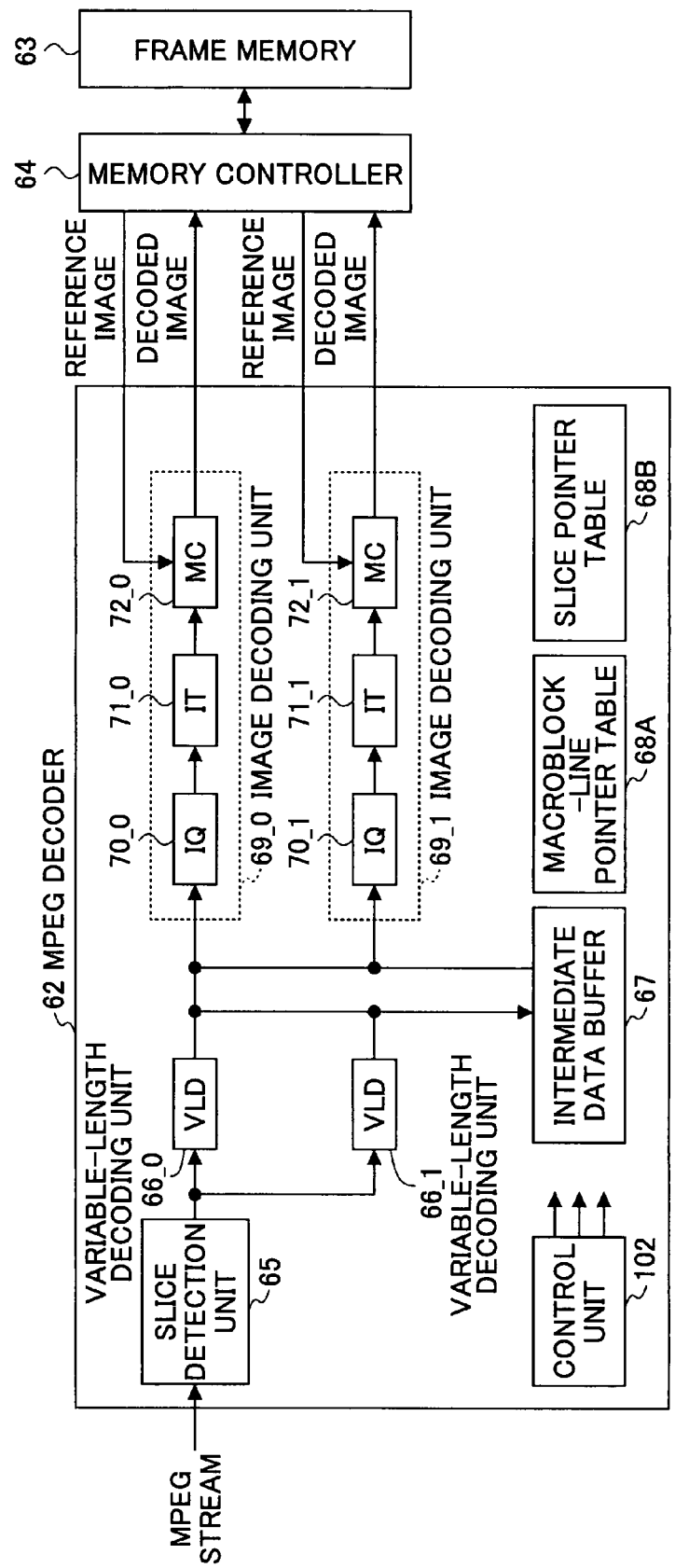
FIG. 12 is a drawing for explaining a third embodiment of an MPEG decoder according to the present invention.

FIG. 12 is a drawing for explaining a third embodiment of an MPEG decoder according to the present invention. FIG. 12 shows an MPEG decoder 62 that is the third embodiment of an MPEG decoder according to the present invention. In FIG. 12, a frame memory 63 stores decoded images output from the MPEG decoder 62, and a memory controller 64 controls the storing of decoded images output from the MPEG decoder 62 in the frame memory 63 and the reading of reference images from the frame memory 63.

In the MPEG decoder 62, a slice detection unit 65 detects slices in an MPEG stream that is to be decoded. Variable-length decoding units (VLD) 66_0 and 66_1 perform variable-length decoding on a slice-by-slice basis, and an intermediate data buffer 67 stores intermediate data output from the variable-length decoding units 66_0 and 66_1. The intermediate data buffer 67 has a capacity for storing the data of multiple macroblock lines.

A macroblock-line pointer table 68A serves to store a macroblock-line pointer indicative of the position of data of a macroblock line stored in the intermediate data buffer 67, and a slice pointer table 68B serves to store a slice pointer indicative of the start position of data of a slice stored in the intermediate data buffer 67.

The variable-length decoding units 66_0 and 66_1 perform variable-length decoding with respect to the slices of pictures included in access units, and write intermediate data to the intermediate data buffer 67. In so doing, the variable-length decoding units 66_0 and 66_1 generate macroblock-line pointers and slice pointers indicative of the storage position of the intermediate data, and record these pointers in the macroblock-line pointer table 68A and the slice pointer table 68B.

An image decoding unit 69_0 reads the intermediate data of even-number macroblock lines from the intermediate data buffer 67 to perform image decoding, and includes an inverse quantization unit (IQ) 70_0, an inverse transformation unit (IT) 71_0, and a motion compensation unit (MC) 72_0.

An image decoding unit 69_1 reads the intermediate data of odd-number macroblock lines from the intermediate data buffer 67 to perform image decoding, and includes an inverse quantization unit (IQ) 70_1, an inverse transformation unit (IT) 71_1, and a motion compensation unit (MC) 72_1.

A control unit 102 attends to the overall control of the MPEG decoder 62. Such overall control includes the management of the pointer table and the allocation of processes to the variable-length decoding units and image decoding units. These control operations performed by the control unit 101 are substantially the same as the control operations performed by the control unit 100.

FIG. 13 is a drawing showing an example of the division of a picture into slices. In this example, the picture 31_0 of an access unit AU0 is divided into three slices SL0, SL1, and SL2, and the picture 31_1 of an access unit AU1 is also divided into three slices SL0, SL1, and SL2.

In the picture 31_0, the beginning of the slice SL1 is positioned to divide a macroblock line MBL4, and the beginning of the slice SL2 is positioned to divide a macroblock line MBL11. In the picture 31_1, the beginning of the slice SL1 is positioned to divide a macroblock line MBL3, and the beginning of the slice SL2 is positioned to divide a macroblock line MBL10.

Figure 16:
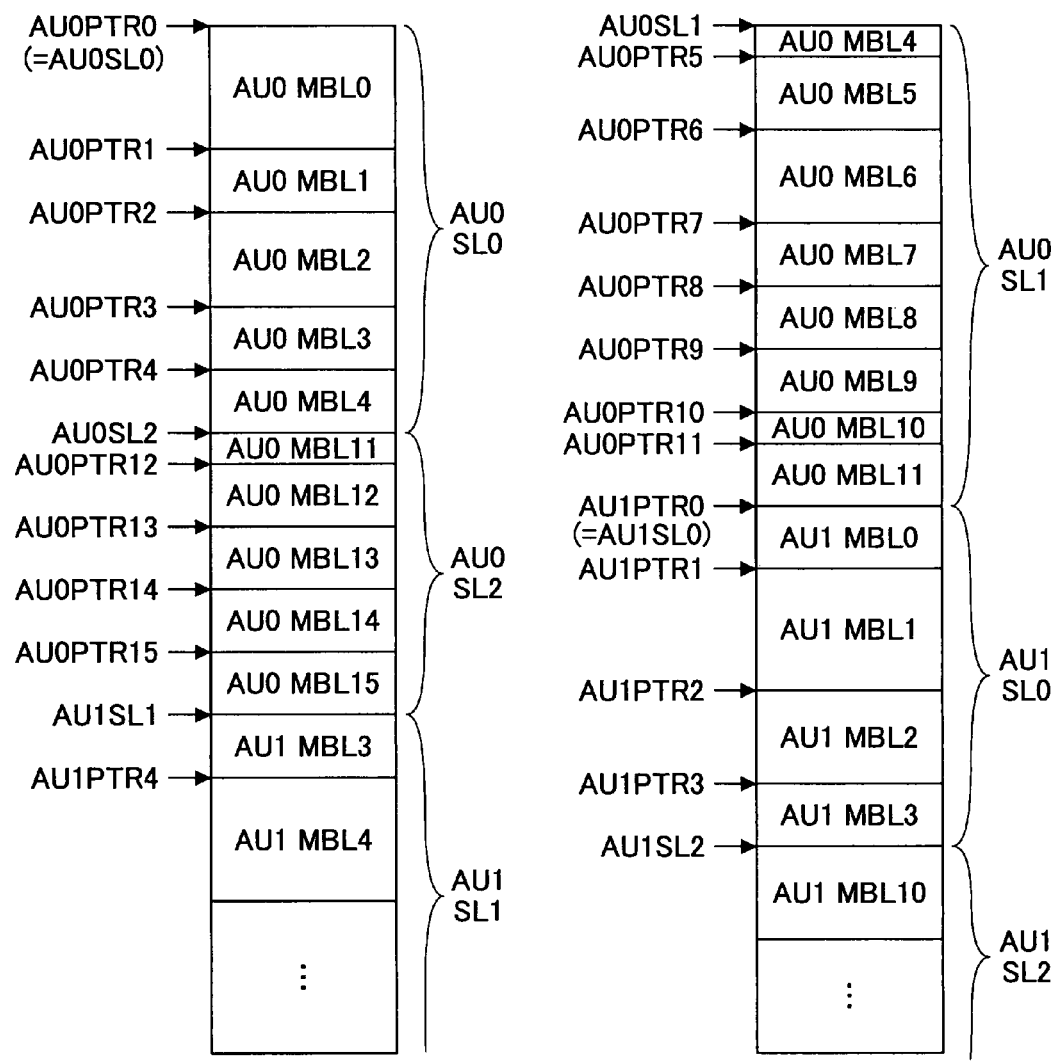
FIG. 16 is a drawing showing the relationship between macroblock-line pointers, slice pointers, and intermediate data corresponding to the macroblock-line pointer table shown in FIG. 14 and the slice pointer table shown in FIG. 15.

FIG. 14 is a drawing showing an example of the macroblock-line pointer table 68A. FIG. 15 is a drawing showing an example of the slice pointer table 68B. FIG. 16 is a drawing showing the relationship between macroblock-line pointers, slice pointers, and intermediate data corresponding to the macroblock-line pointer table 68A shown in FIG. 14 and the slice pointer table 68B shown in FIG. 15. What is shown in FIG. 14, FIG. 15, and FIG. 16 is based on the example of the division of a picture into slices shown in FIG. 13. In FIG. 14 and FIG. 15, the column shown as "REMARKS" is provided only for the purpose of explanation, and is not actually the contents of the macroblock-line pointer table 68A and the slice pointer table 68B.

In FIG. 14 and FIG. 16, a macroblock-line pointer AU0PTRi points to the data start position in the intermediate data buffer 67 of a macroblock line MBLi of a picture included in the access unit AU0, and a macroblock-line pointer AU1PTRi points to the data start position in the intermediate data buffer 67 of a macroblock line MBLi of a picture included in the access unit AU1.

In FIG. 15 and FIG. 16, slice pointers AU0SLj and AU1SLj (j=0, 1, 2) are shown. The slice pointer AU0SLj points to the data start position in the intermediate data buffer 67 of a slice SLj, and the slice pointer AU1SLj points to the data start position in the intermediate data buffer 67 of a slice SLj In FIG. 15, the field referred to as "MBL" shows which macroblock line corresponds to the position indicated by a slice pointer.

In this example, the variable-length decoding unit 66_0 performs variable-length decoding with respect to the slices SL0 and SL2 of a picture included in the access unit AU0 and the slice SL1 of a picture included in the access unit AU1, and write intermediate data to the intermediate data buffer 67. In so doing, the variable-length decoding unit 66_0 generates macroblock-line pointers and slice pointers, and records these pointers in the macroblock-line pointer table 68A and the slice pointer table 68B.

Further, the variable-length decoding unit 66_1 performs variable-length decoding with respect to the slice SL1 of the picture included in the access unit AU0 and the slices SL0 and SL2 of the picture included in the access unit AU1, and write intermediate data to the intermediate data buffer 67. In so doing, the variable-length decoding unit 66_1 generates macroblock-line pointers and slice pointers, and records these pointers in the macroblock-line pointer table 68A and the slice pointer table 68B.

Moreover, in this example, the image decoding unit 69_0 is set as the unit to read even-number macroblock-line pointers AU0PTR0, AU0PTR2, ..., AU0PTR14, AU1PTR0, AU1PTR2, ..., and AU1PTR14 from the macroblock-line pointer table 68A.

The image decoding unit 69_1 is set as the unit to read odd-number macroblock-line pointers AU0PTR1, AU0PTR3, ..., AU0PTR15, AU1PTR1, AU1PTR3, ..., and AU1PTR15 from the macroblock-line pointer table 68A.

Further, the image decoding unit 69_0 is set as the unit to read slice pointers AU0SL0, AU0SL1, AU1SL0, and AU1SL2 from the slice pointer table 68B, and the image decoding unit 69_1 is set as the unit to read slice pointers AU0SL2 and AU1SL1 from the slice pointer table 68B.

The image decoding unit 69_0 acquires the value of the macroblock-line pointer AU0PTR0 from the macroblock-line pointer table 68A, and reads the intermediate data of the macroblock line MBL0 of a picture included in the access unit AU0 from the intermediate data buffer 67 at the data position indicated by the macroblock-line pointer AU0PTR0. The image decoding unit 69_0 performs image decoding with respect to the macroblock line MBL0.

Upon completing the image decoding of the macroblock line MBL0 of the picture included in the access unit AU0, the image decoding unit 69_0 acquires the value of the macroblock-line pointer AU0PTR2, and reads the intermediate data of the macroblock line MBL2 from the intermediate data buffer 67 at the data position indicated by the macroblock-line pointer AU0PTR2. The image decoding unit 69_0 performs image decoding with respect to the macroblock line MBL2.

Upon completing the image decoding of the macroblock line MBL2 of the picture included in the access unit AU0, the image decoding unit 69_0 acquires the value of the macroblock-line pointer AU0PTR4, and reads the intermediate data of the macroblock line MBL4 from the intermediate data buffer 67 at the data position indicated by the macroblock-line pointer AU0PTR4. The image decoding unit 69_0 starts performing image decoding with respect to the macroblock line MBL4.

Since the macroblock line MBL4 is divided at a slice border, the image decoding unit 69_0 jumps to the position indicated by the slice pointer AU0SL1 after processing data from the position indicated by the macroblock-line pointer AU0PTR4 to the position indicated by the slice pointer AU0SL2, followed by continuing decoding with respect to the remaining portion of the macroblock line MBL4. Decoding of even-number macroblock lines is thereafter performed in the same manner. By the same token, the image decoding unit 69_1 performs decoding with respect to odd-number macroblock lines.

Figure 17:
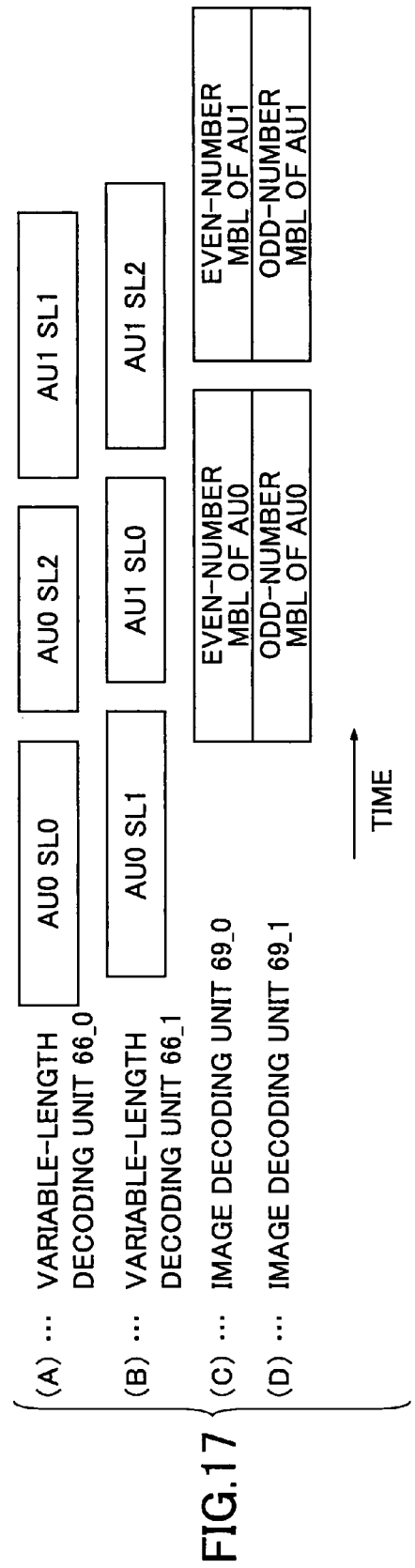
FIG. 17 is a timing chart showing an example of the operation of the third embodiment of an MPEG decoder according to the present invention.

FIG. 17 is a timing chart showing an example of the operation of the MPEG decoder 62 that is the third embodiment of an MPEG decoder according to the present invention. A letter designation (A) shows processing by the variable-length decoding unit 66_0, a letter destination (B) showing processing by the variable-length decoding unit 66_1, a letter designation (C) showing processing by the image decoding unit 69_0, and a letter designation (D) showing processing by the image decoding unit 69_1.

In this example, the variable-length decoding unit 66_0 successively performs variable-length decoding with respect to the slices SL0 and SL2 of the picture included in the access unit AU0 and the slice SL1 of the picture included in the access unit AU1, and the variable-length decoding unit 66_1 successively performs variable-length decoding with respect to the slice 1 of the picture included in the access unit AU0 and the slices SL0 and SL2 of the picture included in the access unit AU1.

Upon the completion of the variable-length decoding of the slice SL0 of the picture of the access unit AU0 performed by the variable-length decoding unit 66_0, the image decoding unit 69_0 starts performing the image decoding of the even-number macroblock lines of the picture of the access unit AU0, and the image decoding unit 69_1 starts performing the image decoding of the odd-number macroblock lines of the picture of the access unit AU0.

Subsequently, the image decoding of the even-number macroblock lines of the picture of the access unit AU0 performed by the image decoding unit 69_0 comes to an end, and the image decoding of the odd-number macroblock lines of the picture of the access unit AU0 performed by the image decoding unit 69_1 comes to an end. By the time this happens, the variable-length decoding of the slice SL0 of the picture included the access unit AU1 performed by the variable-length decoding unit 66_1 has already been completed.

After this, the image decoding unit 69_0 starts performing the image decoding of the even-number macroblock lines of the picture of the access unit AU1, and the image decoding unit 69_1 starts performing the image decoding of the odd-number macroblock lines of the picture of the access unit AU1.

In the MPEG decoder 62 as described above that is the third embodiment of an MPEG decoder according to the present invention, parallel processing at the macroblock line level is performed with respect to the image decoding by the image decoding units 69_0 and 69_1 similarly to the manner in which the related-art MPEG decoder 2 operates. Unlike the related-art MPEG decoder 2, however, the MPEG decoder 32 is also configured such that the variable-length decoding units 66_0 and 66_1 and image decoding units 69_0 and 69_1 are provided with the intermediate data buffer 67 situated therebetween. With this arrangement, parallel processing at the slice level is performed by the variable-length decoding units 66_0 and 66_1 while synchronizing the processing of the image decoding units 69_0 and 69_1 with the processing of the variable-length decoding units 66_0 and 66_1.

As a result, even when the operating frequency of each of the variable-length decoding units 66_0 and 66_1 is set equal to that of the related-art MPEG decoder 2, the speed of variable-length decoding can be increased by the parallel processing at the slice level performed by the variable-length decoding units 66_0 and 66_1. The MPEG decoder 62 can thus achieve high processing performance without increasing the overall operating frequency. Further, since the variable-length decoding is performed in parallel at the slice level, a processing delay can be reduced compared with the case of the picture-level parallel processing.

The MPEG decoder 32 of the first embodiment, the MPEG decoder 52 of the second embodiment, and the MPEG decoder 62 of the third embodiment have been described with respect to a case in which all the variable-length decoding units and the image decoding units are driven. Alternatively, the control unit provided in the MPEG decoder 32 of the first embodiment, the MPEG decoder 52 of the second embodiment, and the MPEG decoder 62 of the third embodiment may be configured to control the number of variable-length decoding units and image decoding units that are driven simultaneously, so that the number of parallel operations is not limited to the above-described example.

In general, the processing speed of a variable-length decoding unit tends to depend on a bit rate. The processing speed of an image decoding unit tends to depend on the number of macroblocks processed per second (i.e., the picture size multiplied by the frame rate). In consideration of this, provision may be made such that the number of parallel operations of variable-length decoding units is determined based on a bit rate, and such that the number of parallel operations of image decoding units is determined based on the number of macroblocks that need to be processed per second.

FIG. 18 is a table showing an example in which the numbers of processing units driven are adjusted in response to a bit rate and the number of processed macroblocks in a configuration in which two variable-length decoding units and two image decoding units are provided. Provision may be made such that only one variable-length decoding unit is driven if the bit rate is smaller than 20 Mbps, and such that two variable-length decoding units are driven in parallel if the bit rate is equal to or larger than 20 Mbps, for example. Provision may further be made such that only one image decoding unit is driven if the number of macroblocks processed per second is smaller than 122400, and such that two image decoding units are driven in parallel if the number of macroblocks processed per second is equal to or larger than 122400, for example. It should be noted that the bit rate may be known based on the information about a bit rate that may be included in an MPEG stream.

The configuration as described above can cope with a situation in which the number of parallel operations of image decoding units needs to be large while the number of parallel operations of variable-length decoding units can be small due to large image size and low bit rate, and can also cope with a situation in which processing performance required for the current needs is smaller than the processing performance of the maximum number of parallel operations provided by the hardware configuration. With such configuration, some of the variable-length decoding units and the image decoding units may be deactivated, thereby reducing power consumption.

Moreover, the MPEG decoder 32 of the first embodiment, the MPEG decoder 52 of the second embodiment, and the MPEG decoder 62 of the third embodiment have been described with respect to an example in which parallel processing at the macroblock line level is performed with respect to image decoding. Alternatively, in the case of MBAFF of H.264/AVC, parallel processing at the macroblock pair line level may be performed with respect to image decoding. In such arrangement, a macroblock-pair-line pointer table is provided in place of the macroblock-line pointer table. The intermediate data buffer is configured to have a capacity for storing the data of multiple macroblock lines.

Embodiment of MPEG Encoder

Figure 19:
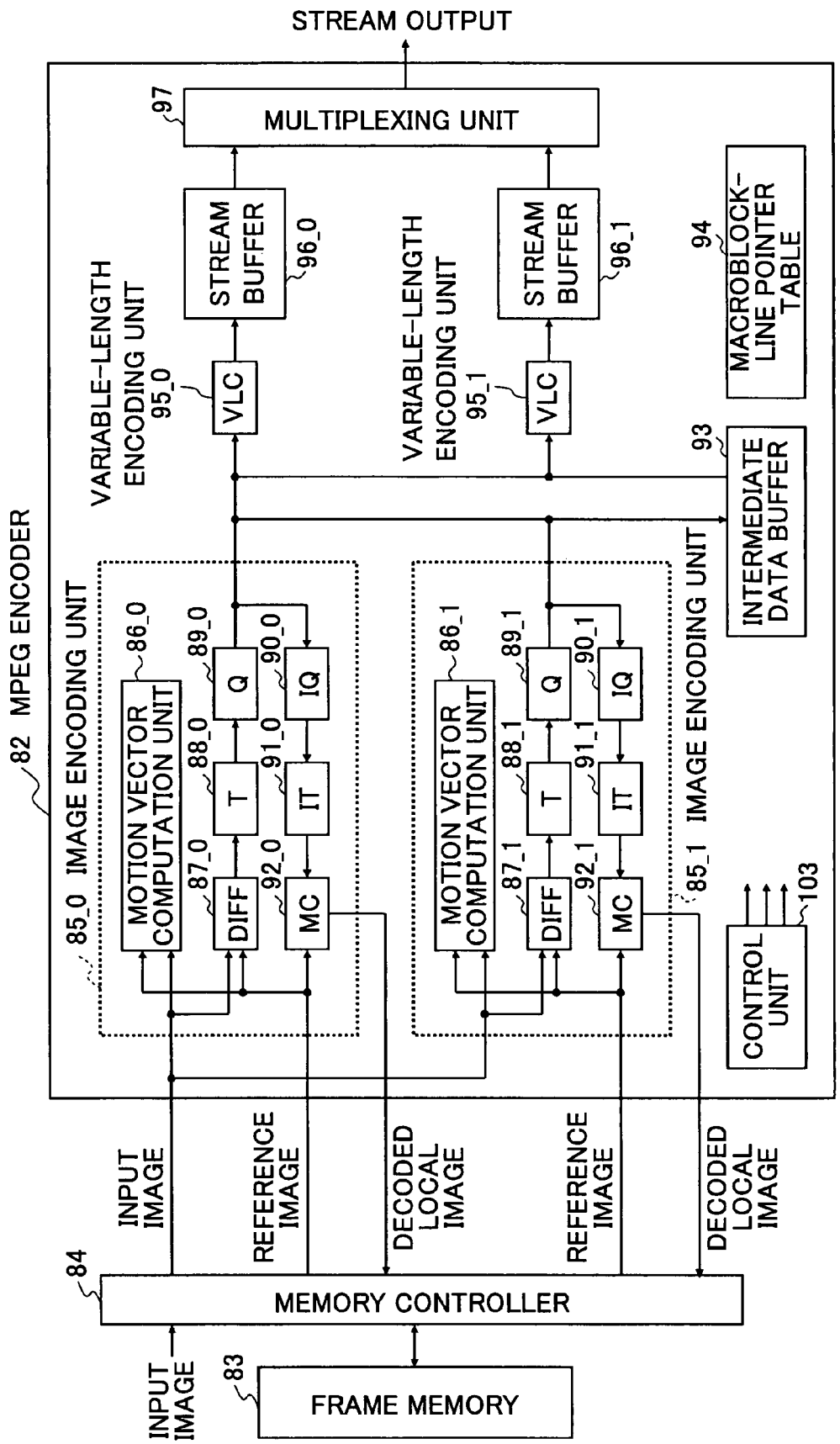
FIG. 19 is a drawing for explaining an embodiment of an MPEG encoder according to the present invention.

FIG. 19 is a drawing for explaining an embodiment of an MPEG encoder according to the present invention. In FIG. 19, an MPEG encoder 82 that is an embodiment of an MPEG encoder of the present invention compresses and encodes input images to generate an MPEG stream.

A frame memory 83 stores decoded local images output from the MPEG encoder 82, and a memory controller 84 controls the storing of decoded local images output from the MPEG encoder 82 in the frame memory 83 and the reading of reference images from the frame memory 83.

An image encoding unit 85_0 serves to perform image encoding with respect to the even-number macroblock lines of input images, and includes a motion vector computation unit 86_0, a differential calculation unit (DIFF) 87_0, an transformation unit (T) 88_0, a quantization unit (IQ) 89_0, an inverse quantization unit (IQ) 90_0, an inverse transformation unit (IT) 91_0, and a motion compensation unit (MC) 92_0.

An image encoding unit 85_1 serves to perform image encoding with respect to the odd-number macroblock lines of input images, and includes a motion vector computation unit 86_1, a differential calculation unit (DIFF) 87_1, an transformation unit (T) 88_1, a quantization unit (IQ) 89_1, an inverse quantization unit (IQ) 90_1, an inverse transformation unit (IT) 91_1, and a motion compensation unit (MC) 92_1.

A intermediate data buffer 93 serves to store intermediate data output from the image encoding units 85_0 and 85_1, and a macroblock-line pointer table 94 serves to store a macroblock-line pointer indicative of the start position of data of a macroblock line stored in the intermediate data buffer 93. The intermediate data buffer 93 has a capacity for storing the data of multiple macroblock lines.

The image encoding units 85_0 and 85_1 perform the image encoding of input images in units of macroblock lines, and write intermediate data to the intermediate data buffer in units of macroblock lines. In so doing, the image encoding units 85_0 and 85_1 generate macroblock-line pointers indicative of storage positions of the intermediate data for recordation in the macroblock-line pointer table 94.

Variable-length encoding units 95_0 and 95_1 read intermediate data from the intermediate data buffer 93 in units of pictures, and perform variable-length encoding. A stream buffer 96_0 stores a stream output from the variable-length encoding unit 95_0, and a stream buffer 96_1 stores a stream output from the variable-length encoding unit 95_1. A multiplexing unit 97 multiplexes the stream stored in the stream buffer 96_0 and the stream stored in the stream buffer 96_1 to generate an MPEG stream.

A control unit 103 attends to the overall control of the MPEG encoder 82. Such overall control includes the management of the pointer table and the allocation of processes to the variable-length encoding units and image encoding units. Such control operations will later be described in detail.

Figure 21:
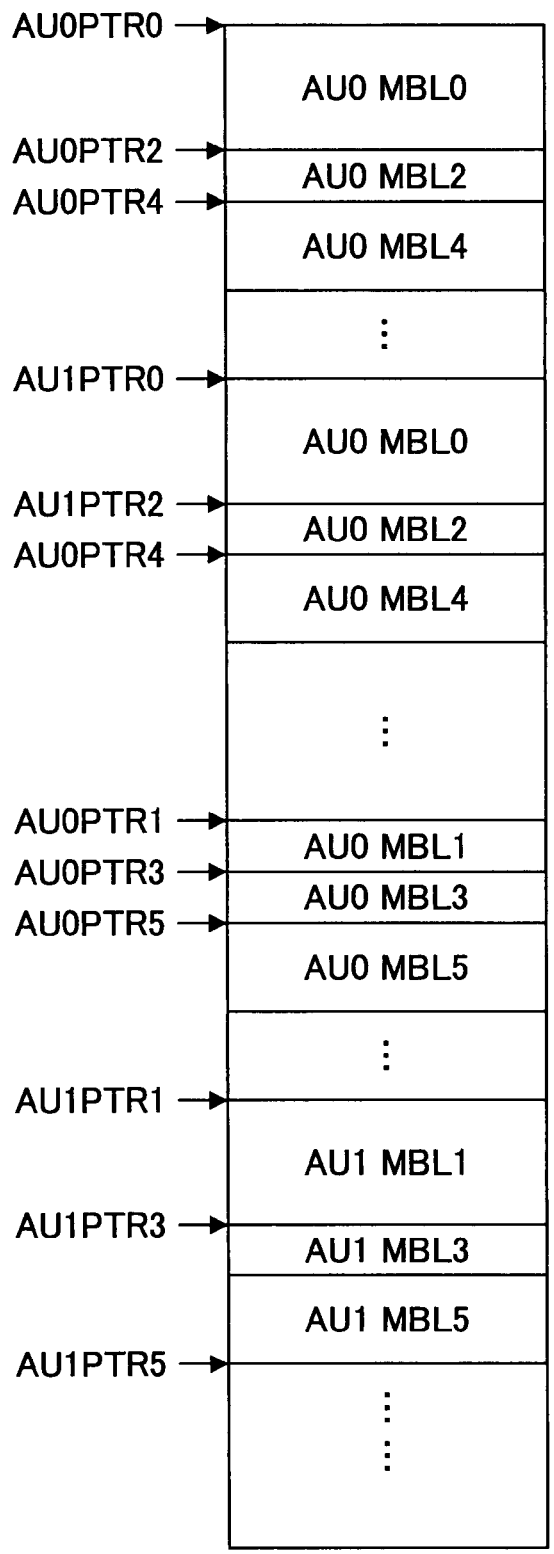
FIG. 21 is a drawing showing the relationship between macroblock-line pointers and intermediate data corresponding to the macroblock-line pointer table shown in FIG. 20.

FIG. 20 is a drawing showing an example of the macroblock-line pointer table 94. FIG. 21 is a drawing showing the relationship between macroblock-line pointers and intermediate data corresponding to the macroblock-line pointer table 94 shown in FIG. 20. In FIG. 20, the column shown as "REMARKS" is provided only for the purpose of explanation, and is not actually the contents of the macroblock-line pointer table 94.

In this example, the image encoding unit 85_0 performs image encoding with respect to even-number macroblock lines MBL0, MBL2, . . . , and MBL14 of a picture of the access unit AU0 and even-number macroblock lines MBL0, MBL2, . . . , and MBL14 of a picture of the access unit AU1, followed by writing intermediate data to the intermediate data buffer 93 in units of macroblock lines. In so doing, the image encoding unit 85_0 generates macroblock-line pointers AU0PTR0, AU0PTR2, . . . , AU0PTR14, AU1PTR0, AU1PTR2, . . . , and AU1PTR14 for recordation in the macroblock-line pointer table 94.

Further, the image encoding unit 85_1 performs image encoding with respect to odd-number macroblock lines MBL1, MBL3, . . . , and MBL15 of the picture of the access unit AU0 and odd-number macroblock lines MBL1, MBL3, . . . , and MBL15 of the picture of the access unit AU1, followed by writing intermediate data to the intermediate data buffer 93 in units of macroblock lines. In so doing, the image encoding unit 85_1 generates macroblock-line pointers AU0PTR1, AU0PTR3, . . . , AU0PTR15, AU1PTR1, AU1PTR3, . . . , and AU1PTR15 for recordation in the macroblock-line pointer table 94.

In this example, the variable-length encoding unit 95_0 is set as the unit to read the pointers AU0PTR0, AU0PTR1, . . . , and AU0PTR15 from the macroblock-line pointer table 94. Further, the variable-length encoding unit 95_1 is set as the unit to read the pointers AU1PTR0, AU1PTR1, . . . , and AU1PTR15 from the macroblock-line pointer table 94.

The variable-length encoding unit 95_0 acquires the value of the macroblock-line pointer AU0PTR0 from the macroblock-line pointer table 94, and reads the intermediate data of the macroblock line MBL0 of a picture included in the access unit AU0 from the intermediate data buffer 93 at the data position indicated by the macroblock-line pointer AU0PTR0. The variable-length encoding unit 95_0 performs image encoding with respect to the macroblock line MBL0.

Upon completing the image encoding of the macroblock line MBL0 of the picture included in the access unit AU0, the variable-length encoding unit 95_0 acquires the value of the macroblock-line pointer AU0PTR1, and reads the intermediate data of the macroblock line MBL1 from the intermediate data buffer 93 at the data position indicated by the macroblock-line pointer AU0PTR1. The variable-length encoding unit 95_0 performs image encoding with respect to the macroblock line MBL1. Variable-length encoding of the picture of the access unit AU0 thereafter continues in the same manner.

The variable-length encoding unit 95_1 acquires the value of the macroblock-line pointer AU1PTR0 from the macroblock-line pointer table 94, and reads the intermediate data of the macroblock line MBL0 of a picture included in the access unit AU1 from the intermediate data buffer 93 at the data position indicated by the macroblock-line pointer AU1PTR0. The variable-length encoding unit 95_1 performs image encoding with respect to the macroblock line MBL0.

Upon completing the image encoding of the macroblock line MBL0 of the picture included in the access unit AU1, the variable-length encoding unit 95_1 acquires the value of the macroblock-line pointer AU1PTR1, and reads the intermediate data of the macroblock line MBL1 from the intermediate data buffer 93 at the data position indicated by the macroblock-line pointer AU1PTR1. The variable-length encoding unit 95_0 performs image encoding with respect to the macroblock line MBL1. Variable-length encoding of the picture of the access unit AU1 thereafter continues in the same manner.

Figure 22:
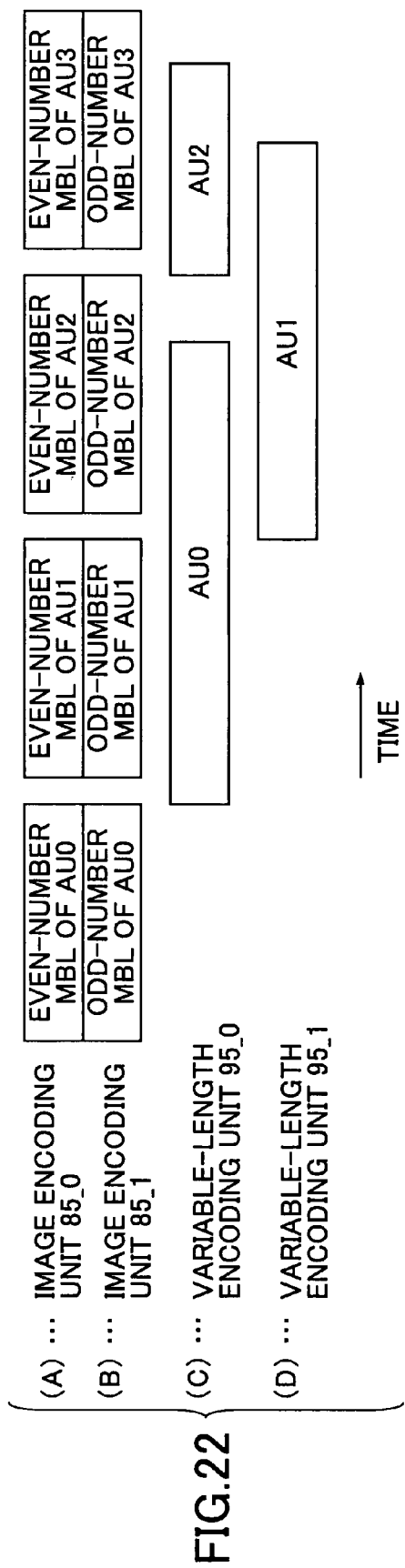
FIG. 22 is a timing chart showing an example of the operation of the embodiment of an MPEG encoder according to the present invention.

FIG. 22 is a timing chart showing an example of the operation of the MPEG encoder 82 that is the embodiment of an MPEG encoder according to the present invention. A letter designation (A) shows processing by the image encoding unit 85_0, a letter destination (B) showing processing by the image encoding unit 85_1, a letter designation (C) showing processing by the variable-length encoding unit 95_0, and a letter designation (D) showing processing by the variable-length encoding unit 95_1.

In this example, the image encoding unit 85_0 performs image encoding with respect to the even-number macroblock lines of the picture of the access unit AU0, the even-number macroblock lines of the picture of the access unit AU1, the even-number macroblock lines of the picture of the access unit AU2, and the even-number macroblock lines of the picture of the access unit AU3 in this order.

Further, the image encoding unit 85_1 performs image encoding with respect to the odd-number macroblock lines of the picture of the access unit AU0, the odd-number macroblock lines of the picture of the access unit AU1, the odd-number macroblock lines of the picture of the access unit AU2, and the odd-number macroblock lines of the picture of the access unit AU3 in this order.

In this example, when the image encoding of the picture of the access unit AU0 performed by the image encoding units 85_0 and 85_1 comes to an end, the variable-length encoding unit 95_0 starts performing variable-length encoding with respect to the picture of the access unit AU0.

When the image encoding of the picture of the access unit AU1 performed by the image encoding units 85_0 and 85_1 subsequently comes to an end, the variable-length encoding unit 95_1 starts performing variable-length encoding with respect to the picture of the access unit AU1.

The image encoding of the picture of the access unit AU2 performed by the image encoding units 85_0 and 85_1 thereafter comes to an end. By the time this happens, the variable-length encoding unit 95_0 has already completed variable-length encoding with respect to the picture of the access unit AU0, and, thus, starts performing variable-length encoding with respect to the picture of the access unit AU2.

Figure 23:
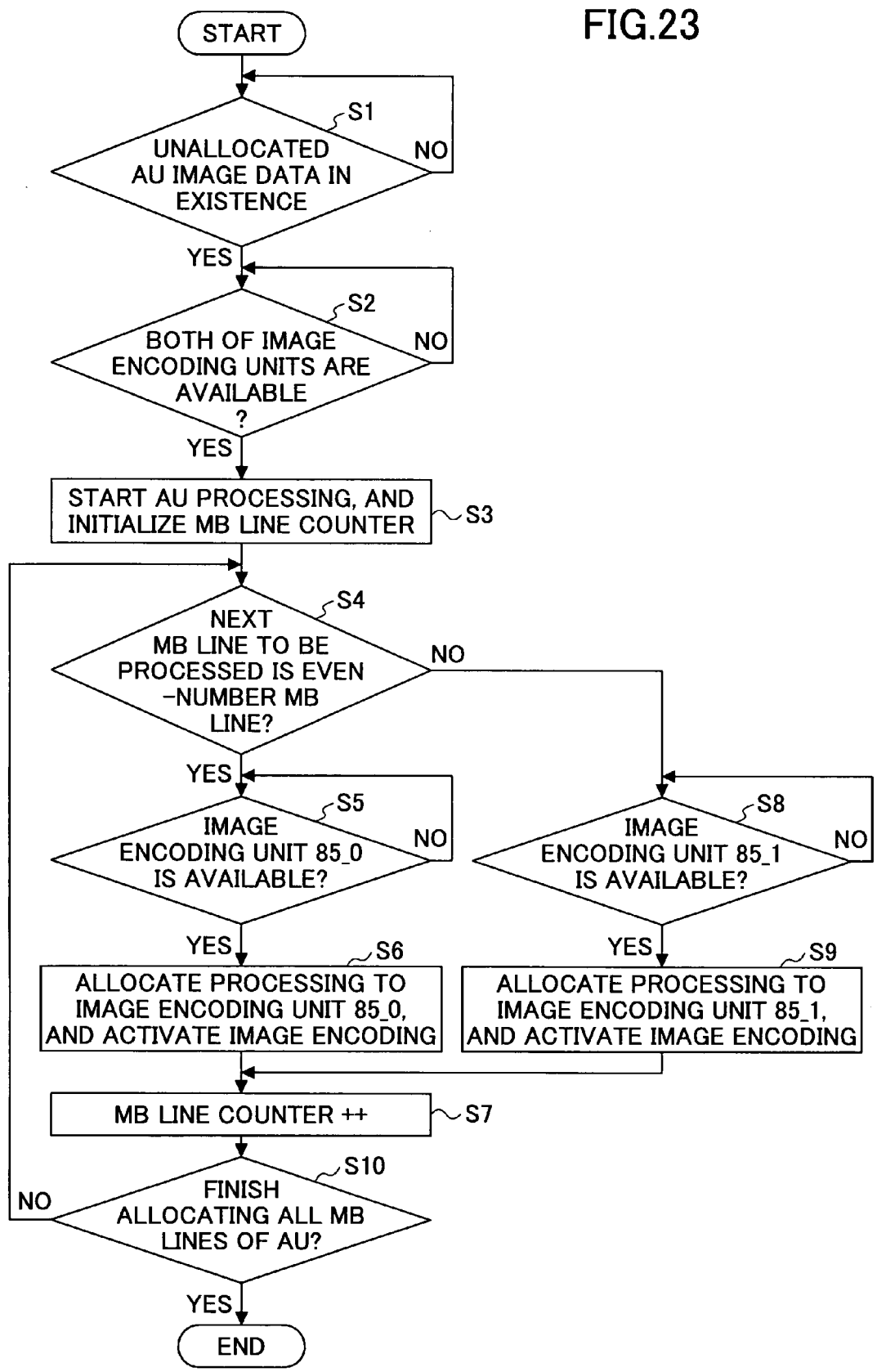
FIG. 23 is a flowchart showing the control procedure for allocating processes to image encoding units.

FIG. 23 is a flowchart showing the control procedure for allocating processes to image encoding units. The allocation of MB-line data processing to the two image encoding units is controlled by the control unit 103.

A check is made as to whether there is unallocated AU image data that needs to be processed (step S1). When the preparation of AU image data is not yet done, the completion of such preparation is awaited. Upon the completion of preparation of AU image data (YES at step S1), a check is made as to whether both of the image encoding units 85_0 and 85_1 are available (step S2). If either one of them is being used, the completion of ongoing processing is awaited. At the start of AU processing, an MB line counter is initialized to zero (step S3). Since the MB line count is zero for the first MB line to be processed (YES at step S4), the procedure goes to step S5 that is relevant to even-number-data processing. Since the image encoding unit 85_0 is not being used at the beginning (YES at step S5), the process is allocated to the image encoding unit 85_0, and the image encoding of the MB line (macroblock line) is activated (step S6). The MB line counter then counts up (step S7) for allocation of the processing of the next MB line. The procedure this time proceeds to step S8 that is relevant to odd-number-data processing. The process is allocated to the image encoding unit 85_1, and the image encoding of the MB line (macroblock line) is activated (step S9). For the allocation of a next MB line, the procedure proceeds to step S5 that is relevant to the even-number-data processing. If the image encoding unit 85_0 is busy processing the preceding MB line, the completion of this processing is awaited. When the processing of the preceding MB line comes to an end (YES at step S5), the allocation and activation processes are performed (step S6). The allocation of image encoding of MB lines thereafter continues while incrementing the MB line counter one by one. When all the MB lines in the current AU are processed (YES at step S10), the processing of the current AU comes to an end.

Figure 24:
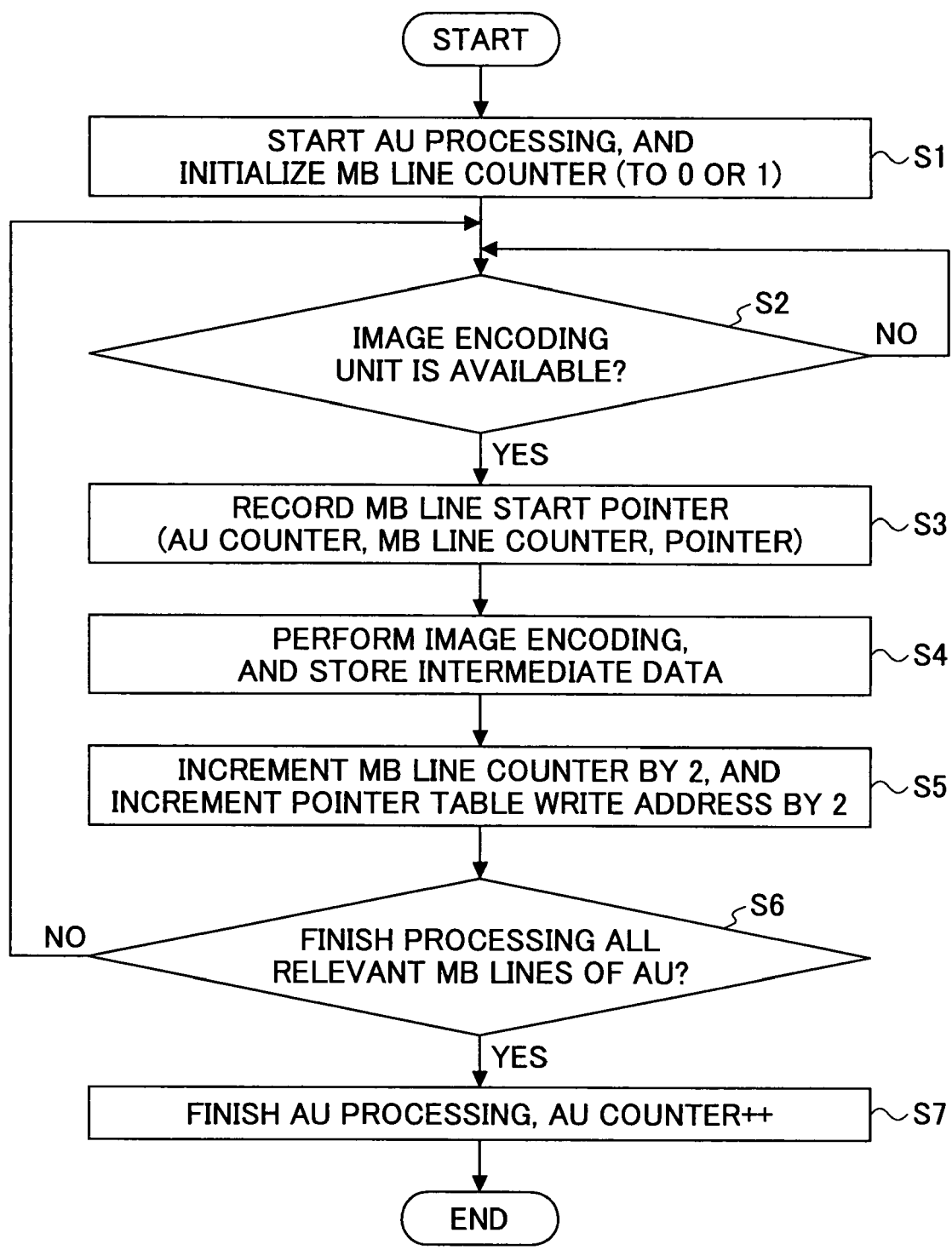
FIG. 24 is a flowchart showing the process of generating pointers performed by an image encoding unit.

FIG. 24 is a flowchart showing the process of generating pointers performed by an image encoding unit. At the start of AU processing, an MB line counter is initialized (step S1). The MB line counter for the image encoding unit 85_0 is set to zero, and the MB line counter for the image encoding unit 85_1 is set to 1. In the following, a description will be given of the case of the image encoding unit 85_0.

If the image encoding unit 85_0 is not in use (step S2), the procedure proceeds to step S3 in which an MB line start pointer is recorded. In this pointer recording, a write pointer for the intermediate data buffer that is in existence at the start of processing of a given MB line (i.e., macroblock line) is recorded in such a manner that it is associated with the AU number indicated by an AU counter and the MB line number indicated by the MB line counter. After the recording of the pointer, the image encoding unit is activated, and the encoding of an image and the storing of intermediate data start (step S4). The write pointer for the intermediate data buffer is successively incremented in conjunction with the writing of intermediate data generated by the image encoding.

After the activation of the image encoding unit, the MB line counter counts up by an increment of two (step S5), followed by the processing of a next MB line in which if the image encoding unit is busy, the completion of the processing is awaited.

The reason why the amount of the increment is set to two is because every other MB line is to be allocated to the image encoding unit 85_0. The same procedure is thereafter repeated. When all the MB lines assigned in the current AU are processed (YES at step S6), the processing of the current AU comes to an end, and the AU counter counts up (step S7). In this manner, the image encoding unit 85_0 generates pointers corresponding to the even-number macroblock lines MBL0, MBL2, MBL4, and so on. The image encoding unit 85_1 performs the same procedure with an initial value of 1 set to the MB line counter at the beginning of AU processing, thereby generating pointers corresponding to odd-number macroblock lines MBL1, MBL3, MBL5, and so on.

It should be noted that since the image encoding units 85_0 and 85_1 use separate areas in the intermediate data buffer, separate write pointers are used. In detail, the same configuration as the intermediate-data-storing-&-pointer-generating unit 110 shown in FIG. 7 may be included in each Q of the image encoding units 85_0 and 85_1, and receives encoded data as intermediate data to be stored.

Figure 25:
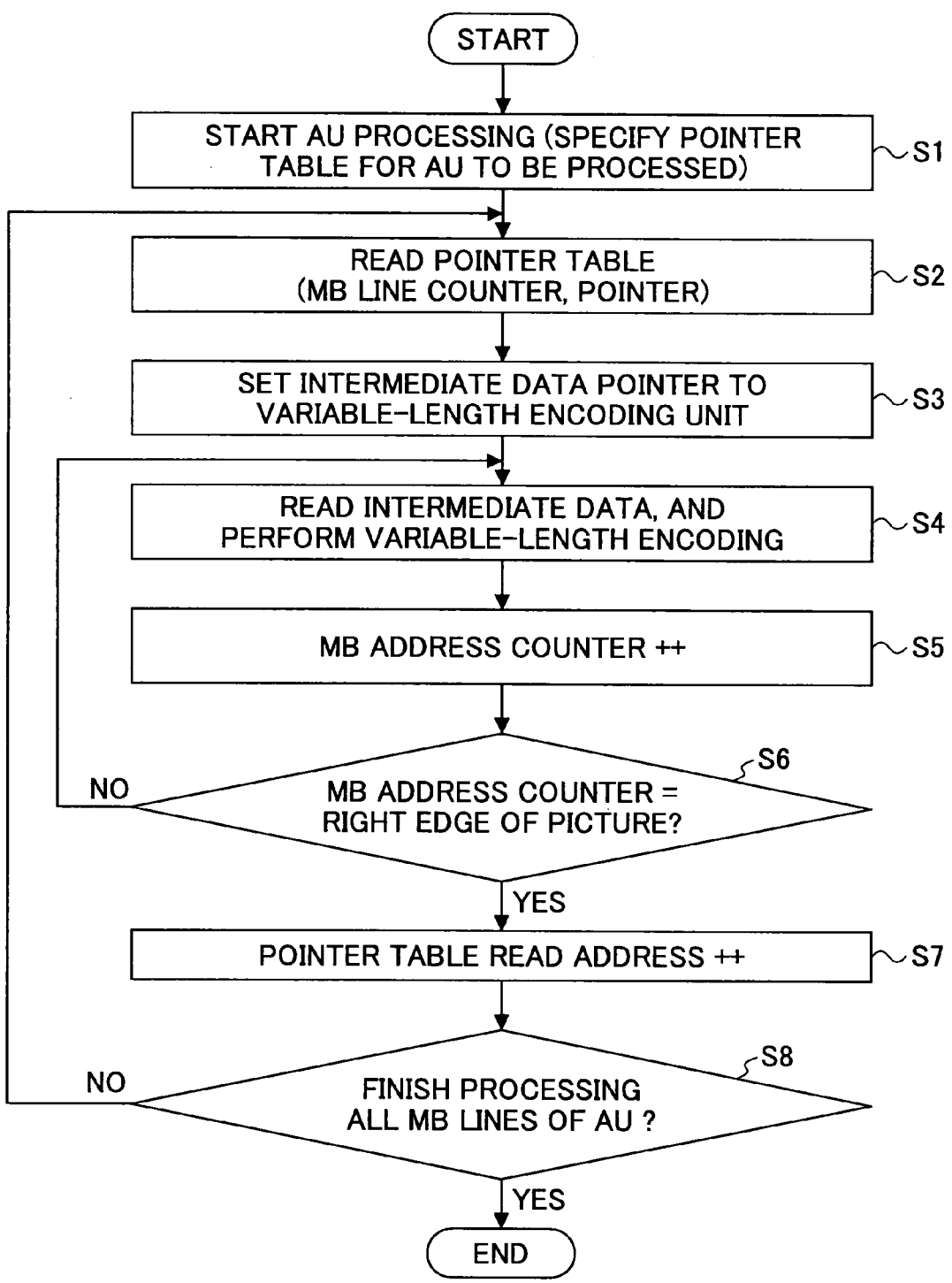
FIG. 25 is a flowchart showing the process of setting pointers to the variable-length encoding units.

FIG. 25 is a flowchart showing the process of setting pointers to the variable-length encoding units. The control unit 103 identifies a pointer table corresponding to the AU number of the AU to be processed at the start of AU processing (step S1), and then reads the pointer table (step S2). Entries in the pointer table are read in an ascending order of MB line sequence numbers, and the pointers for reading intermediate data are set to the variable-length encoding units (step S3). The variable-length encoding units read intermediate data from the positions indicated by the pointers, and perform variable-length encoding (step S4). Variable-length encoding is performed in units of macroblocks, and the MB address counter is incremented each time one macroblock is processed (step S5). When the count of the MB address counter reaches the value indicative of the right-hand-side edge of the picture (YES at step S6), the processing of the current MB line comes to an end. The counter indicative of a pointer table address is then incremented for the processing of a next MB line (step S7). While the MB lines are successively processed, the reading of intermediate data for each MB line is performed by alternating between the data generated by the image encoding unit 85_0 and the data generated by the image encoding unit 85_1. This is because the pointer table is configured in such a manner. When all the MB lines in the current AU are processed (YES at step S8), the processing of the current AU comes to an end.

In the MPEG encoder 82 as described above that is the embodiment of an MPEG encoder according to the present invention, parallel processing at the macroblock line level is performed with respect to the image encoding by the image encoding units 85_0 and 85_1, and, further, these image encoding units 85_0 and 85_1 and the variable-length encoding units 95_0 and 95_1 are provided with the intermediate data buffer 93 situated therebetween. With this arrangement, parallel processing at the picture level is performed by the variable-length encoding units 95_0 and 95_1 while synchronizing the processing of the image encoding units 85_0 and 85_1 with the processing of the variable-length encoding units 95_0 and 95_1. The number of variable-length encoding units is not limited to two, and variable-length encoding units may be provided as many as necessary for required processing performance. The number of variable-length encoding units may even be 1.

With this arrangement, the parallel processing at the picture level performed with respect to variable-length image encoding by the variable-length encoding units 95_0 and 95_1 can increase the processing speed of variable-length encoding even if the operating frequency of each of the variable-length encoding units 95_0 and 95_1 is low. The MPEG encoder 82 can thus achieve high processing performance without increasing the overall operating frequency.

It should be noted that although the variable-length encoding units 95_0 and 95_1 of the MPEG encoder 82 described above perform processing in units of pictures, the variable-length encoding units 95_0 and 95_1 may alternatively perform processing in units of slices, such that parallel processing at the slice level is implemented. In such configuration, a slice pointer table for recording slice pointers indicative of borders between slices is used.

Further, the MPEG encoder 82 that is the embodiment of an MPEG encoder according to the present invention has been described with respect to a case in which all the image encoding units and the variable-length encoding units are driven. Alternatively, the control unit provided in the MPEG encoder 82 of this embodiment may be configured to control the number of image encoding units and variable-length encoding units that are driven simultaneously.

Moreover, the MPEG encoder 82 that is the embodiment of an MPEG encoder of the present invention has been described with respect to an example in which parallel processing at the macroblock line level is performed with respect to image encoding. Alternatively, in the case of MBAFF of H.264/AVC, parallel processing at the macroblock pair line level may be performed with respect to image encoding. In such arrangement, a macroblock-pair-line pointer table is provided in place of the macroblock-line pointer table. The intermediate data buffer is configured to have a capacity for storing the data of multiple macroblock lines.

According to at least one embodiment of an MPEG decoder, a data buffer for storing data output from one or more variable-length decoding units is provided between the one or more variable-length decoding units and a plurality of image decoding units. With this arrangement, parallel processing by the image decoding units can be made to match the required processing performance if only one variable-length decoding unit is provided, and parallel processing by the variable-length decoding units and the image decoding units can be made to match the required processing performance if a plurality of variable-length decoding units are provided. This achieves high processing performance.

According to at least one embodiment of an MPEG encoder, a data buffer for storing data output from a plurality of image encoding units is provided between the plurality of image encoding units and one or more variable-length encoding units. With this arrangement, parallel processing by the image encoding units can be made to match the required processing performance if only one variable-length encoding unit is provided, and parallel processing by the image encoding units and the variable-length encoding units can be made to match the required processing performance if a plurality of variable-length encoding units are provided. This achieves high processing performance.

Further, the present invention is not limited to these embodiments, but various variations and modifications may be made without departing from the scope of the present invention.

What is claimed is:

1. A moving picture decoding apparatus, comprising:
one or more variable-length decoding units;
a data buffer storing data of a plurality of macroblock lines output from the one or more variable-length decoding units;
a macroblock line pointer table storing a macroblock line pointer that indicates a head position of one of the plurality of macroblock lines; and
a plurality of image decoding units reading the data from the data buffer and decoding the data,
wherein the plurality of image decoding units read the data of one of the plurality of macroblock lines respectively based on the macroblock line pointer and performs parallel decoding in units of a macroblock line or in units of macroblock pair lines.

2. The moving-picture decoding apparatus as claimed in claim 1, wherein the data buffer includes a first recording unit storing the macroblock line pointer.

3. The moving-picture decoding apparatus as claimed in claim 2, wherein the one or more variable-length decoding units include a counter counting a number of macroblocks included in the data.

4. The moving-picture decoding apparatus as claimed in claim 3, further comprising a pointer generating unit generating the macroblock line pointers or the macroblock pair line pointers based on the number of macroblocks counted by the counter.

5. The moving-picture decoding apparatus as claimed in claim 1, wherein the data buffer includes a second recording unit storing slice pointers indicative of slice boundaries in the data.

6. The moving-picture decoding apparatus as claimed in claim 1, wherein the one or more variable-length decoding units are a plurality of variable-length decoding units performing parallel processing in units of pictures, and wherein the image decoding units read the data stored in the data buffer and perform parallel processing in units of macroblock lines or in units of macroblock pair lines.

7. The moving-picture decoding apparatus as claimed in claim 1, wherein the one or more variable-length decoding units are a plurality of variable-length decoding units performing parallel processing in units of slices, and wherein the image decoding units read the data stored in the data buffer and to perform parallel processing in units of macroblock lines or in units of macroblock pair lines.

8. The moving-picture decoding apparatus as claimed in claim 1, wherein the one or more variable-length decoding units are a plurality of variable-length decoding units, and wherein a number of units driven among the variable-length decoding units and a number of units driven among the image decoding units are controllable.

9. A moving picture encoding apparatus, comprising:
a plurality of image encoding units;
a data buffer storing data of a plurality of macroblock lines output from the plurality of image encoding units;
a macroblock line pointer table storing a macroblock line pointer that indicates a head position of one of the plurality of macroblock lines; and
one or more variable-length encoding units reading the data from the data buffer and encoding the data,
wherein the plurality of image encoding units are configured to perform parallel processing in units of macroblock lines or in units of macroblock pair lines.

10. The moving-picture encoding apparatus as claimed in claim 9, further comprising a first recording unit storing the macroblock line pointer.

11. The moving-picture encoding apparatus as claimed in claim 10, wherein the one or more variable-length encoding units include a counter counting a number of macroblocks included in the data.

12. The moving-picture encoding apparatus as claimed in claim 11, further comprising a pointer generating unit generating the macroblock line pointers or the macroblock pair line pointers based on the number of macroblocks counted by the counter.

13. The moving-picture encoding apparatus as claimed in claim 9, further comprising a second recording unit storing slice pointers indicative of slice boundaries of the data stored in the data buffer.

14. The moving-picture encoding apparatus as claimed in claim 9, wherein the one or more variable-length encoding units are configured to successively read the data in units of macroblock lines or in units of macroblock pair lines and to perform variable-length encoding with respect to the read data.

15. The moving-picture encoding apparatus as claimed in claim 9, wherein the one or more variable-length encoding units are a plurality of variable-length encoding units, and the plurality of variable-length encoding units perform parallel processing in units of pictures.

16. The moving-picture encoding apparatus as claimed in claim 9, wherein the one or more variable-length encoding units are a plurality of variable-length encoding units, and the plurality of variable-length encoding units perform parallel processing in units of slices.

17. The moving-picture encoding apparatus as claimed in claim 9, wherein the one or more variable-length encoding units are a plurality of variable-length encoding units, and wherein a number of units driven among the image encoding units and a number of units driven among the variable-length encoding units are controllable.

18. A non-transitory computer readable medium allowing a coding unit, to execute a process, the process comprising:
acquiring a value of at least one macroblock line pointer;
reading data of at least one macroblock line from a data buffer at a position indicated by the at least macroblock line pointer; and
performing coding with respect to the at least one macroblock line,
wherein said performing occurs in units of the at least one macroblock line or in units of macroblock pair lines.

19. The non-transitory computer readable medium of claim 18, wherein coding may include variable length encoding or variable length decoding.

20. The non-transitory computer readable medium of claim 18, wherein the at least one macroblock line pointer is a slice pointer and the at least one macroblock line is a unit of slices.

* * * * *

UNITED STATES PATENT AND TRADEMARK OFFICE
CERTIFICATE OF CORRECTION

PATENT NO. : 8,259,810 B2  
APPLICATION NO. : 11/898061  
DATED : September 4, 2012  
INVENTOR(S) : Yasuhiro Watanabe et al.

Page 1 of 1

It is certified that error appears in the above-identified patent and that said Letters Patent is hereby corrected as shown below:

Column 22, Line 53, In Claim 18, before "macroblock" insert -- one --.

Signed and Sealed this  
Nineteenth Day of March, 2013

Teresa Stanek Rea  
*Acting Director of the United States Patent and Trademark Office*